United States Patent
Maschmeyer et al.

(10) Patent No.: US 12,386,478 B2
(45) Date of Patent: **\*Aug. 12, 2025**

(54) SYSTEM AND METHOD FOR MANIPULATION OF 3D OBJECTS IN ELECTRONIC USER INTERFACES

(71) Applicant: Shopify Inc., Ottawa (CA)

(72) Inventors: Russ Maschmeyer, Berkeley, CA (US); Hettige Ray Perera Jayatunga, Toronto (CA)

(73) Assignee: Shopify Inc., Ottawa (CA)

( * ) Notice: Subject to any disclaimer, the term of this patent is extended or adjusted under 35 U.S.C. 154(b) by 0 days.

This patent is subject to a terminal disclaimer.

(21) Appl. No.: 18/675,024

(22) Filed: May 27, 2024

(65) Prior Publication Data
US 2024/0345695 A1   Oct. 17, 2024

Related U.S. Application Data

(63) Continuation of application No. 17/752,214, filed on May 24, 2022, now Pat. No. 12,026,349.

(51) Int. Cl.
*G06F 3/04815* (2022.01)
*G06F 3/04842* (2022.01)
*G06F 3/04845* (2022.01)
*G06F 3/04847* (2022.01)
*G06F 3/04883* (2022.01)
*G06F 16/9538* (2019.01)
(Continued)

(52) U.S. Cl.
CPC ...... *G06F 3/04815* (2013.01); *G06F 3/04845* (2013.01); *G06F 3/04847* (2013.01); *G06F 3/04883* (2013.01); *G06F 16/9538* (2019.01); *G06Q 30/0623* (2013.01); *G06Q 30/0643* (2013.01); *G06T 15/00* (2013.01); *G06T 19/00* (2013.01); *G06F 3/04842* (2013.01); *G06T 2200/04* (2013.01); *G06T 2200/24* (2013.01); *G06T 2219/2016* (2013.01)

(58) Field of Classification Search
CPC ............. G06F 3/04815; G06F 3/04845; G06F 3/04847; G06F 3/04883; G06F 16/9538; G06F 3/04842; G06Q 30/0623; G06Q 30/0643; G06T 15/00; G06T 19/00; G06T 2200/04; G06T 2200/24; G06T 2219/2016; G06T 19/20
See application file for complete search history.

(56) References Cited

U.S. PATENT DOCUMENTS 6,002,402 A * 12/1999 Schacher .............. G06F 3/0481 715/810
12,026,349 B2 * 7/2024 Maschmeyer ...... G06F 3/04845
(Continued)

*Primary Examiner* — Nicholas Ulrich
(74) *Attorney, Agent, or Firm* — CPST Intellectual Property Inc.; Brett J. Slaney

(57) ABSTRACT

A system and method are provided for displaying objects in electronic user interfaces. The method includes receiving, via a user interface, a first input defining a manipulation to be applied to a three-dimensional (3D) object corresponding to a two-dimensional (2D) image displayed in the user interface. The method also includes determining an initial positioning of a corresponding 3D model to be applied when loading an updated 3D model to replace the 2D image. The method also includes manipulating, in the user interface, the corresponding 3D object according to the first input.

20 Claims, 14 Drawing Sheets

(51) Int. Cl.
    *G06Q 30/0601*    (2023.01)
    *G06T 15/00*    (2011.01)
    *G06T 19/00*    (2011.01)

(56) References Cited

U.S. PATENT DOCUMENTS

| | | |
|---|---|---|
| 2005/0108620 A1 | 5/2005 | Allyn |
| 2013/0346911 A1 | 12/2013 | Sripada |
| 2014/0195963 A1 | 7/2014 | Cheung |
| 2017/0213389 A1 | 7/2017 | Han |
| 2020/0026419 A1 | 1/2020 | Jang |
| 2021/0271370 A1* | 9/2021 | Williams ................ G06F 9/451 |
| 2023/0042369 A1 | 2/2023 | Bockem |

* cited by examiner

FIG. 11

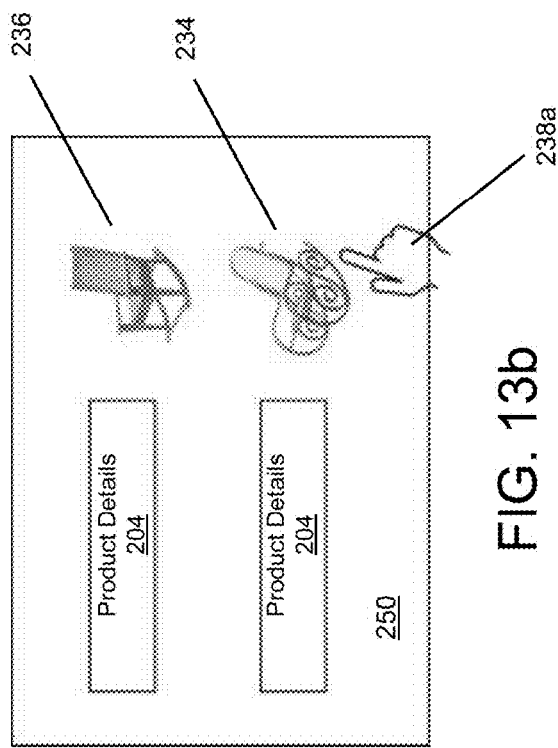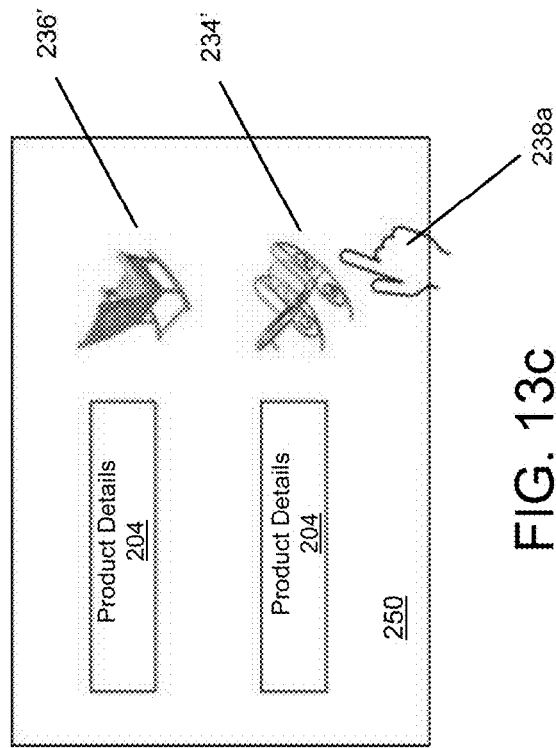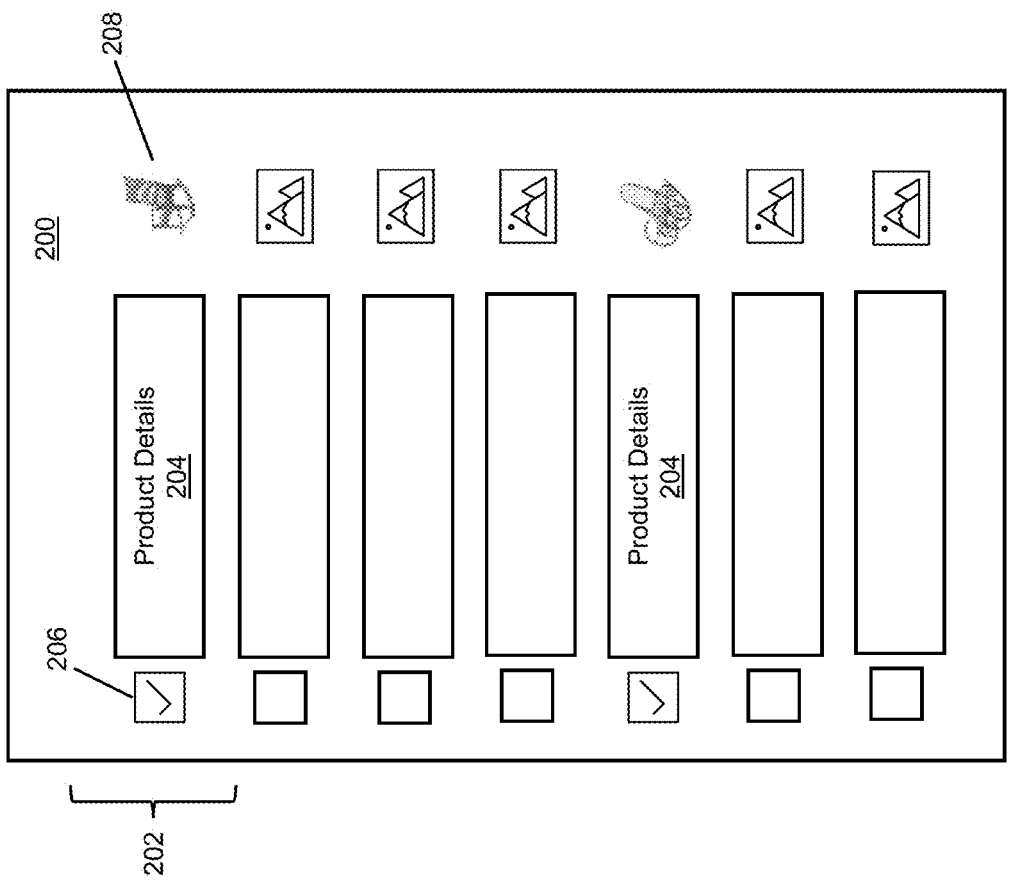

SYSTEM AND METHOD FOR MANIPULATION OF 3D OBJECTS IN ELECTRONIC USER INTERFACES

CROSS-REFERENCE TO RELATED APPLICATION(S)

This application is a continuation of U.S. patent application Ser. No. 17/752,214, filed on May 24, 2022, the entire contents of which are incorporated herein by reference.

TECHNICAL FIELD

The following relates generally to electronic user interfaces and displaying and interacting with objects in such electronic user interfaces, and, in particular, to tandem manipulation of 3D objects in such electronic user interfaces.

BACKGROUND

Items that are viewed and interacted with via electronic user interfaces are typically done so individually. For example, items on a search page are typically presented as a product title and other information, adjacent to a thumbnail image. The thumbnail image is often a two-dimensional (2D) image depicting the product and there may be multiple 2D images providing different views of the product. Current user interaction flows in this example may provide a poor user experience for customers who wish to compare multiple products to each other in the same session, tab, or window.

Currently, a customer is required to apply an input that individually selects each product in the search result or listing that they are interested in, and then browse through the different product images associated with the selected product. In order to view another product and/or to look at different views or perspectives of the same product (or the other product), a customer would need to return to the search results page and repeat the process for the other product.

As a result, this type of flow can result in a disjointed and inconvenient experience for the customer. This inconvenient experience can be further degraded when performed on relatively smaller devices such as mobile phones, tablets, handheld gaming devices and the like.

BRIEF DESCRIPTION OF THE DRAWINGS

Embodiments will now be described with reference to the appended drawings wherein:

FIG. 11 shows an example of a user interface for interacting with the e-commerce platform shown in FIG. 10.

FIGS. 13a to 13c illustrate example user interfaces providing a tandem 3D manipulation option within a product or item listing, for example, a search results page.

DETAILED DESCRIPTION

Figure 1:
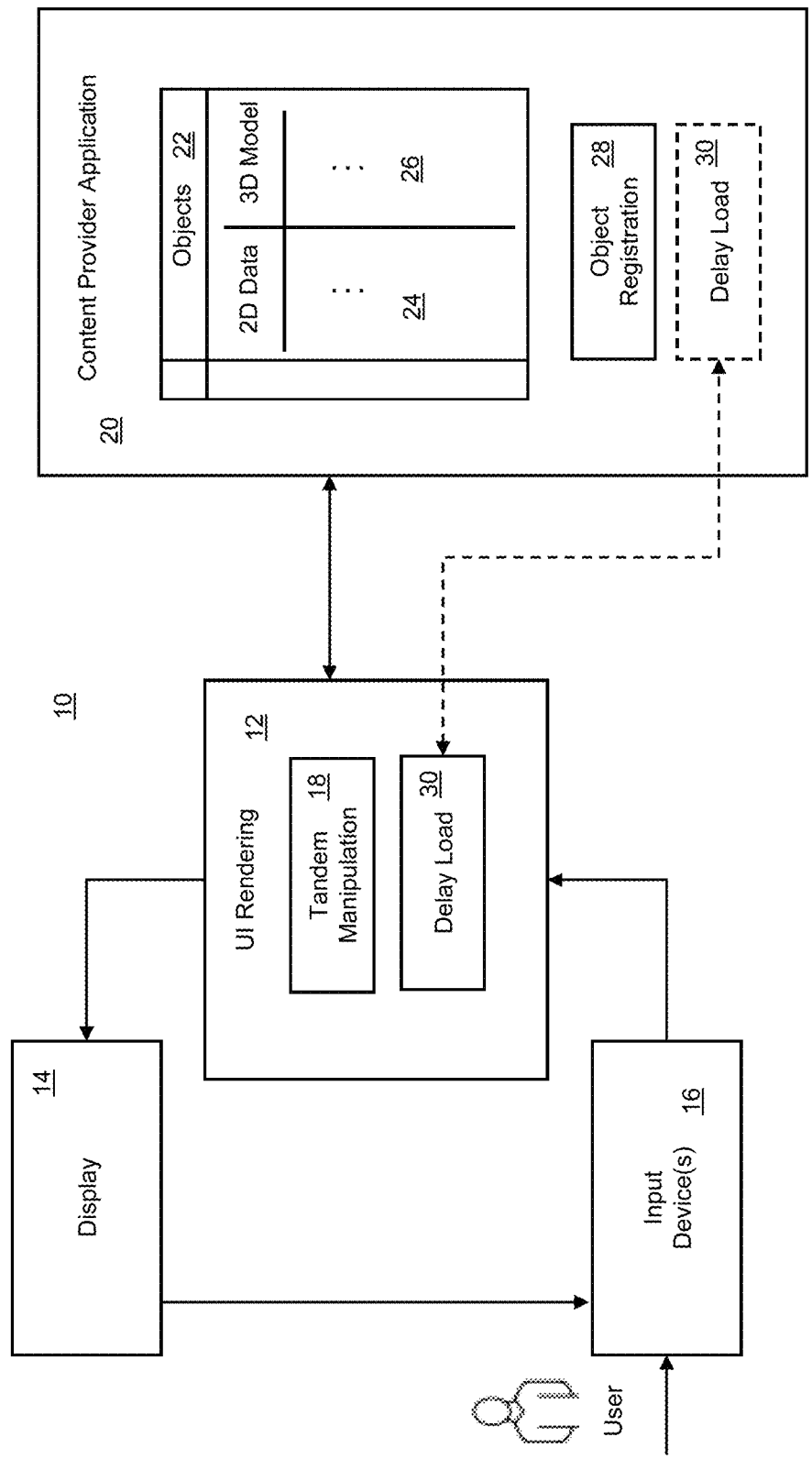
FIG. 1 is an example of a computing environment in which a component to perform tandem 3D manipulation in a user interface is provided.

The following provides a convenient flow and enhanced user experience when viewing 3D objects in electronic user interfaces. This enhanced user experience can be provided by enabling users to manipulate multiple 3D objects displayed in the user interface, individually in tandem.

In one aspect, there is provided a method of a computer-implemented method comprising: receiving, via a user interface, a first input defining a rotation to be applied to each of a plurality of three-dimensional (3D) objects displayed in the user interface; and manipulating, in the user interface, each of the plurality of 3D objects in tandem according to the first input, the manipulating comprising rotating each of the plurality of 3D objects individually in tandem according to the rotation to be applied.

In another aspect, there is provided a system that includes at least one processor; at least one communications module to communicate with an input module of an electronic device; and at least one memory, the at least one memory comprising computer executable instructions that, when executed by the at least one processor, causes the system to: receive, via a user interface, a first input defining a rotation to be applied to each of a plurality of three-dimensional (3D) objects displayed in the user interface; and manipulate, in the user interface, each of the plurality of 3D objects in tandem according to the first input, the manipulating comprising rotating each of the plurality of 3D objects individually in tandem according to the rotation to be applied.

In yet another aspect, there is provided a computer readable medium comprising computer executable instructions that when executed by a processor, cause the processor to execute instructions comprising: receiving, via a user interface, a first input defining a rotation to be applied to each of a plurality of three-dimensional (3D) objects displayed in the user interface; and manipulating, in the user interface, each of the plurality of 3D objects in tandem according to the first input, the manipulating comprising rotating each of the plurality of 3D objects individually in tandem according to the rotation to be applied.

In certain example embodiments, each 3D object can include an associated 3D model used to visualize the 3D object in the user interface.

In certain example embodiments, the method can include displaying, in the user interface, a visual depiction of each of the plurality of 3D objects prior to receiving the first input, wherein the first input comprises a first portion initiating a tandem 3D manipulation mode and a second portion associated with applying the rotation. The first and second portions of the first input can correspond to a same gesture.

In certain example embodiments, at least two of the plurality of 3D objects can include different views of a same object, and wherein the manipulating comprises rotating the different views of the same object individually in tandem.

In certain example embodiments, the method can include displaying, in the user interface, a two-dimensional (2D) image for at least one of the plurality of 3D objects prior to receiving the first input. The first input can be applied to at least one 2D image whereupon a corresponding 3D model is loaded to display the 3D object in the user interface. The method can further include determining, from the first input applied to the at least one 2D image, an initial positioning of the corresponding 3D model that is to be applied in tandem once the 3D model is loaded; detecting that the 3D model has been loaded; applying the initial positioning to the loaded 3D model to generate an updated 3D model; and replacing the 2D image with the corresponding updated 3D model. The method can also include displaying a video corresponding to the at least one 2D image while the corresponding 3D model is being loaded, the video playing a representative rotation corresponding to the input applied to the at least one 2D image.

In certain example embodiments, the method can further include aligning each 3D model to a same reference view; and displaying the corresponding 3D objects aligned to the same reference view prior to receiving the first input. At least two of the 3D objects can include a different reference view of a same object, and wherein the manipulating comprises changing the orientation relative to the different reference views individually in tandem.

In certain example embodiments, the method can further include associating at least one reference view with at least one 3D model by: determining the at least one reference view to be applied to the 3D model; applying an image processing technique to the 3D model to determine coordinates in the 3D model that correspond to each of the at least one reference view; and storing metadata with the 3D model to enable alignment of the 3D model to a desired reference view in the user interface. The 3D model can include a plurality of reference views.

In certain example embodiments, the 3D objects can be displayed in the user interface as search results to a search query received from an input device.

In certain example embodiments, the manipulating can be initiated in response to a selection of at least one of the 3D objects in the user interface.

Tandem Manipulation of 3D Objects in User Interfaces

In the following, the expressions "tandem", "in tandem" and/or "individually in tandem", may refer to the same manipulation(s) being applied individually to multiple 3D objects at same time as discussed in greater detail below. Such 3D objects may also be referred to as 3D "thumbnails" and can be considered, or may otherwise refer to, objects having corresponding data files or data objects used to store, access, and display 3D models of objects that are often displayed using static 2D image-based thumbnails.

While the 3D models are particularly convenient for comparing multiple different 3D objects, the principles discussed herein can also be configured to provide tandem manipulation of the same 3D object from different viewpoints or perspectives. As such, "tandem manipulation" can encompass both inputs that apply the same movement (e.g., rotation, tilt/yaw/roll, translation, zoom, etc.) to the same view of different objects at the same time, and inputs that apply the same movement to different views of the same object at the same time. Moreover, the term "movement" can encompass any 3D movement (also referred to herein as a manipulation or change in orientation) about or relative to one or more axes (including zoom operations along such axes) and should not be limited to any one type of movement. For example, while tandem rotation about a single axis would be a common way to compare items, more complex manipulations, including rotations about multiple axes as well as zoom operations are also possible in tandem as described and illustrated by way of examples presented herein.

The presently described tandem 3D manipulations can be launched or otherwise triggered in a tandem 3D manipulation mode or tandem 3D manipulation function/operation, from any electronic user interface where a user is presented with more than one item or object to be viewed at the same time (e.g., side-by-side, adjacent, near, above/below, etc.). This can include a search results page, a catalogue of items, or any other user interface with two or more objects that can be visually compared. In certain embodiments, each one from the list or collection of objects can be included in the tandem 3D manipulation mode or this list or collection can be filtered or provide an option to select desired ones of the objects. Similarly, such filtering or selection can be applied so as to have only those objects having access to a corresponding 3D model included in the tandem 3D manipulation mode.

The tandem manipulation of the 3D models enables a user to compare multiple relevant search results (or selected items) from different perspectives of the object(s) directly from the user interface (e.g., products listed in a search results page), without the need to navigate to and between different product pages for each object of interest.

An alignment process is also provided, which aligns axes and/or coordinates of the 3D models such that the user has a consistent perspective when viewing the objects at the same time. For example, each object capable of being viewed in the tandem 3D manipulation mode can be assigned a default starting angle or "reference view" to align the 3D perspective with other objects. This can be done by applying an image processing technique to each 3D object when loaded into the system while executing an offline registration of the 3D model. The image processing technique can be applied to either align the 3D object in its launch state or to include metadata to have the 3D model "snap" to the desired reference view (e.g., a default view) regardless of the state of the 3D model when it has been stored, launched, deactivated, etc. Reference 2D images of the reference view(s) can also be saved for each object to make a 2D list view consistent with the tandem 3D manipulation starting point. It should be noted that each object can also be given multiple viewing start angles or reference views (rather than a single default) to permit the same object to be viewed in tandem from different angles. To trigger such a "self-comparison" mode, the user interface can include an option to view the same object from different angles (e.g., perspective view versus plan view). Each angle can begin with a 2D image of the starting point and then two different versions of the 3D model can be loaded, each oriented to the corresponding starting reference angle. In this way, the input used to manipulate the 3D objects would apply the same movements in the same way to multiple 3D models of that object.

The inputs (e.g., activation/gesture(s)) used to trigger the tandem 3D manipulation mode can vary from embodiment to embodiment. The activation can range from a button or menu selection to a gesture or command triggered from within an appropriate user interface as further described below. For example, a physical tilt gesture can be used as a user input to the system to first enable the activation of the 3D models, and then to apply the tandem manipulation to the 3D models. In another example, a gesture to switch between the tandem 3D manipulation mode and a single manipulation mode can include hovering with two fingers on one model for a specific period of time or holding down simultaneously on two models at the same time. In another example, a gesture can trigger a prompt to activate the tandem 3D manipulation mode when a sequence of alternative manipulations between a plurality of 3D models is detected. For instance, a user can move one then clicks to move another to a similar position then moves the first one, etc. That back and forth gesture could thus be a trigger to activate the tandem 3D manipulation mode. Activation of the 3D models and tandem manipulation of the 3D models can be enabled by the same gesture, e.g., to provide a fluid user experience, although any two inputs can be utilized for such activation and manipulation. The activation of the tandem 3D manipulation mode can involve the detection of a 3D manipulation-type gesture applied to the initial 2D image (such as a swipe across the object image or a video having such an object image) can trigger the loading of the corresponding 3D model(s) in the background. More granular detection of this type of input can also be used to estimate where the 3D model would have landed had that input been applied to the 3D object and an offset applied to the registered/normalized reference view(s) of the 3D objects to lead the user to believe that they have already started the tandem 3D manipulation.

To offset expected latencies attributed to loading 3D models, and to avoid the need to pre-load such 3D models when it is unknown whether the user will activate the tandem 3D manipulation mode, a delay load process can be applied. The delay load process can transition from a 2D image of the object to the 3D model or can have an intermediate step that transitions from the 2D image to a 2D video of a particular movement to mimic a 3D manipulation while the actual/full 3D model is being loaded. In such an implementation, multiple 2D videos can be stored and loaded according to a detected input applied to the 2D image. For example, the system can detect an up/down swipe versus a left/right swipe and load a corresponding 2D video while estimating the extent of the initial movement as explained above. The system could also have a 2D image and be briefly non-responsive, but still collect the gesture and then proceed to load the 3D model (e.g., responsive to that interaction) and then "catch up" by manipulating that 3D model based on the gesture once it is loaded. That is, in the background, the 3D model can be loaded with an offset applied to catch up based on the movement queued up by the user when the 3D model has been loaded. In this way, an undesirable delay can be masked by the loading technique while the 3D models are loaded. It can be appreciated that whether to apply the delay load technique can be determined based on the size of the 3D models and/or the computing power of the system. That is, the loading technique is not required to trigger or utilize the tandem 3D manipulation mode but can serve as an advantageous technique to complement the workflow associated with utilizing this mode.

The system described herein incorporated into a computing environment such as one utilizing an electronic device improves the functioning of such a computer or computing environment by improving the user experience by reducing the number of selections and eliminating (or at least reducing) the time required to navigate back and forth between product pages. This user experience also enhances the functioning of the computing environment by reducing the amount of time and computing power required to view multiple products. For example, the activation and loading techniques can reduce the storage and processing requirements in at least some scenarios and, by masking the loading process and/or otherwise reducing latency, can further improve the functioning of the computing environment. Similarly, the offline preprocessing performed to normalize or register the 3D models according to one or more reference views can offload processing from a client device to a more powerful system and at a more convenient time.

Turning now to the figures, FIG. 1 illustrates an example of a computing environment 10 in which the tandem manipulation of 3D objects can be applied. The computing environment 10 shown in FIG. 1 can represent a single device such as a portable electronic device or the integration/cooperation of multiple electronic devices such as a client device and server device or a client device and a remote or offsite storage or processing entity or service. That is, the computing environment 10 can be implemented using any one or more electronic devices including standalone devices and those connected to offsite storage and processing (e.g., via cloud-based computing storage and processing facilities). For example, a user interface may be provided by an electronic device while data used to load, view, and manipulate the 3D objects described herein can, at least in part, be stored and accessed from an external memory or application, including a cloud-based service or application.

Such electronic devices can include, but are not limited to, a mobile phone, a personal computer, a laptop computer, a tablet computer, a notebook computer, a hand-held computer, a personal digital assistant, a portable navigation device, a wearable device, a gaming device, an embedded device, a smart phone, a virtual reality device, an augmented reality device, etc.

The computing environment 10 includes a user interface (UI) rendering component 12 that is coupled to a display 14 to render and present/display UI elements on the display 14.

While examples referred to herein may refer to a single display 14 for ease of illustration, the principles discussed herein can also be applied to multiple displays 14, e.g., to compare multiple objects at the same time on side-by-side screens. That is, any reference to a display 14 can include any one or more displays 14 or screens providing similar visual functions. The UI rendering component 12 receives one or more inputs from one or more input devices 16, which can include or incorporate inputs made via the display 14 as illustrated in FIG. 1 as well as any other available input to the computing environment 10, such as haptic or touch gestures, voice commands, eye tracking, biometrics, keyboard or button presses, etc. Such inputs may be applied by a user interacting with the computing environment 10, e.g., by operating an electronic device having the display 14 and at least an interface to one or more input devices 16. The UI rendering component 12 also includes a tandem manipulation component 18, which is shown as a separate element for ease of illustration. That is, the tandem manipulation component 18 can be implemented as a separate component coupled to the UI rendering component 12 or be integrated/embedded in the UI rendering component 12. As such, the configuration shown in FIG. 1 is for illustrative purposes and can be reconfigured to suit different computing environments 10. For example, the tandem manipulation component 18 could be provided by a separate entity such as a server application connected to the UI rendering component 12 over a communication network (not shown). Such communication network(s) may include a telephone network, cellular, and/or data communication network to connect different types of client- and/or server-type devices. For example, the communication network may include a private or public switched telephone network (PSTN), mobile network (e.g., code division multiple access (CDMA) network, global system for mobile communications (GSM) network, and/or any 3G, 4G, or 5G wireless carrier network, etc.), WiFi or other similar wireless network, and a private and/or public wide area network (e.g., the Internet).

The computing environment 10 also includes a content provider application 20, which can be a standalone application or feature embedded in or accessed by another application or service. The content provider application 20 represents an application that has been programmed, configured, and can be instructed or requested to provide content to the UI rendering component 12 as illustrated in FIG. 1, in order to display such content on the display 14. As described herein, such content can include stored objects 22 that when rendered in a UI are manipulated individually in tandem using the tandem manipulation component 18. In this example, the objects 22 can be stored in a database or other storage element such as a memory as entries, elements, or files that can include 2D data 24 and, for at least some objects 22, 3D models 26. The objects 22 can therefore have 2D data 24 providing 2D content to the UI rendering component 12 to be displayed on the display 14 as well as associated 3D content such as 3D models 26 corresponding to 2D images of the same object. The content provider application 20 can be a module or feature embedded in or accessible to any application that provides 2D and/or 3D content as an output, in response to a request, query, trigger, threshold or other input. For example, the content provider application 20 can facilitate responding to a search query or detect a navigation into a catalogue or other list of objects 22 to be displayed to a user within the computing environment 10. As noted above, the computing environment 10 can represent a single electronic device or multiple electronic devices in a client-server relationship such that the content provider application 20 can be either an application running on the same electronic device as the display 14, input device(s) 16 and UI rendering component 12, or be a remote service that receives and responds to data retrieval calls from the UI rendering component 12, e.g., in providing a tandem 3D manipulation mode in a UI being displayed on the display 14.

The content provider application 20 can also include an object registration component 28 to register the objects 22 according to one or more reference views. As noted above, the object registration component 28 can include or have access to an image processing technique that can be applied to each 3D object (via data in the 3D model 26) when loaded into the database of objects 22. This can be done as an offline registration of the 3D model 26. The image processing technique can be applied to either align the 3D object in its launch state or include metadata to have the 3D model 26 snap to the desired reference view (e.g., a default view) regardless of the state of the 3D model 26 when it has been stored, launched, deactivated, etc. Reference 2D images of the reference view(s) can also be saved as 2D data 24 for each object to make a 2D list view consistent with the tandem 3D manipulation starting point. As discussed above, each object 22 can be given multiple viewing start angles or reference views (rather than a single default) to permit the same object to be viewed in tandem from different angles or to begin being displayed as viewed from different angles.

The UI rendering component 12 in this example also includes a delay load component 30 to offset expected latencies attributed to loading 3D models 26, and to avoid the need to pre-load such 3D models when it is unknown whether the user will activate the tandem 3D manipulation mode. As shown in dashed lines, the content provider application 20 can also (or instead) include the delay load component 30 or have a version thereof for operations executed by the content provider application 20 in executing the delay load function. As discussed in greater detail below, the delay load component 30 leverages the 2D data 24 to allow a user to begin interacting with the object 22 while the 3D model 26 is being loaded, or to provide a 3D representation (e.g., perspective image) of the object 22 when the tandem 3D manipulation mode is not being utilized or has not yet initialized.

Figure 2B:
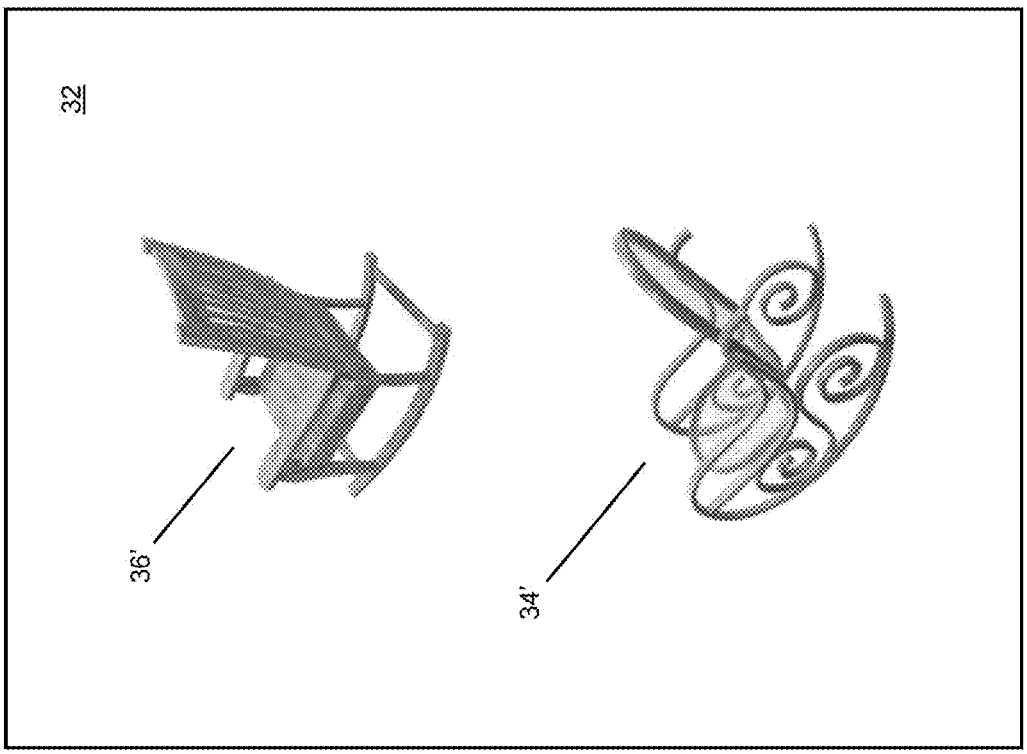
FIG. 2b shows the user interface shown in FIG. 2a in relation to a tandem rotation of the multiple 3D objects being displayed in the user interface according to an input applied to one of the 3D objects.
Figure 2A:
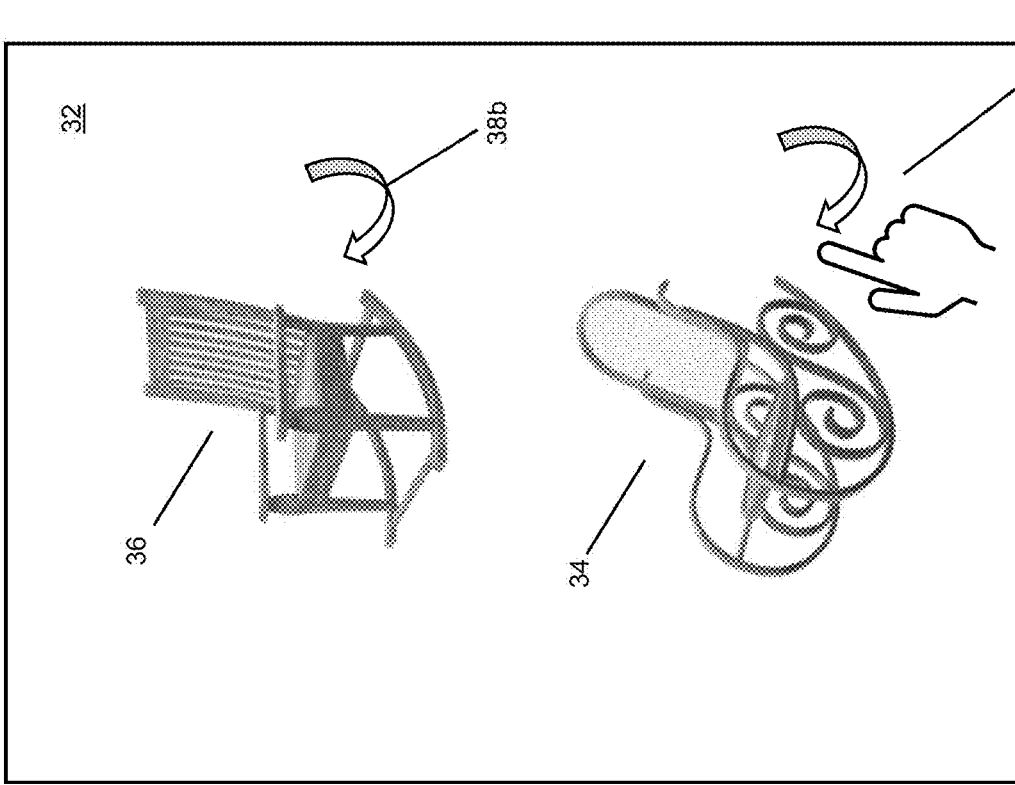
FIG. 2a illustrates an example of a user interface displaying multiple three-dimensional (3D) objects, which can be interacted with to perform a tandem 3D manipulation.

Referring now to FIGS. 2a and 2b, a screen shot of a UI 32 viewed on the display 14 is shown. In this example, the tandem 3D manipulation mode is either in the process of being used or can be initiated by interacting with the UI 32. As shown, a first object 34 is being displayed with a second object 36 in the UI 32. The first and second objects 34, 36 are displayed as manipulatable 3D objects in the UI 32 and can be manipulated individually in tandem. It may be noted that "individually" in tandem may refer to each object 34, 36 being manipulated (e.g., rotated) about its own respective internal axis/axes as opposed to a global axis associated with the surrounding environment. In other words, the objects 34, 36 are manipulated "in place", for example, by rotation in place, which may also be considered a rotation without translation relative to the surrounding environment. That is, individually in tandem can be contrasted to a global rotation of an environment being viewed and rotated about the user, wherein instead each object 34, 36 is rotated or otherwise manipulated in some other way in place, about its own respective ax(es).

The first and second objects 34, 36 can be initially displayed using 2D data 24, for example, using 2D images or 2D videos or can be initially displayed for and/or prior to displaying the corresponding 3D model 26. The delay load module 30 can therefore be selectively used or not used depending on the application 20 and computing power available within the computing environment 10.

To illustrate a tandem 3D manipulation, FIG. 2a includes a pictorial representation of a touch swipe gesture applied to a portion of the UI 32 that corresponds to or is adjacent to the first object 34, such that the corresponding input device 16 detects an input being applied to the first object 34, e.g., to swipe from right to left to impart a rotation about an axis that is generally vertical relative to the corresponding real-world orientation of the first object 34 as it is shown in FIG. 2a. This applied manipulation input 38a has a corresponding tandem manipulation input 38b that is applied to the second object 36 individually in tandem, without requiring the same input to be applied to the second object 36. It can be appreciated that the rotational arrows and pictorial representation of the touch gesture shown in FIG. 2a are included for the purpose of illustrating the tandem application of inputs 38a, 38b and in this example are not part of the UI 32. The touch gesture applies the same manipulation to each of the first and second objects 34, 36 individually in tandem to simultaneously rotate both objects 34, 36 by manipulating the corresponding 3D models 26 to render and display first and second manipulated objects 34', 36'. That is, the applied manipulation input 38a initiates a rotation of both objects 34, 36 about one or more axes as shown in FIG. 2b and is applied in the same way to both the first object 34 and the second object 36 to render the first and second manipulated objects 34', 36'. The first and second objects 34, 36 in this example are displayed using corresponding 3D models 26 of the respective objects 22 stored by the content provider application 22. The 3D models 26 can be updated in real-time to provide a visual progression or animation of the manipulation within the UI 32. That is, a progression of intermediate views may be displayed in real-time between what is shown in FIG. 2a and what is shown in FIG. 2b. In this way, a single gesture applied to one of the objects 34, 36 (or to another single area of the UI 32) activates or otherwise utilizes the tandem manipulation component 18 to apply the same movements (e.g., rotation, zoom, translation, etc.) at the same time to both displayed objects 34, 36.

The 3D models 26 corresponding to the manipulated objects 34', 36' can be further manipulated by detecting and repeating the application of the detected gesture (or other input 16) applied to one of the manipulated objects 34', 36' to render further manipulated objects (not shown). The UI rendering component 12 or tandem manipulation component 18 can also replace the 3D models 26 that currently display the manipulated objects 34', 36' with the corresponding 2D data 24 until a further manipulation is detected. For example, after detecting a timeout threshold, the UI rendering component 12 or tandem manipulation component 18 can load a pre-stored 2D image (if available) or obtain a screen shot of the 3D model 26 in its current orientation to reduce the computational power required to further interact with the 3D models 26 being displayed in the UI 32. For example, an input can be detected to close/end a tandem 3D manipulation mode and the displayed objects 34', 36' swapped with corresponding 2D images to enable the user to move to a next stage of UI interaction such as to select a product for checkout or to drill in for additional information. In another scenario, if the tandem 3D manipulation mode is switched off and the user is manipulating only one 3D object, the other displayed objects may transition to such screenshots in order to reduce drain on computational resources. In this way, the tandem manipulation component 18 can be configured to be selectively turned on and off in different scenarios or steps of the workflow, to reduce processing power and/or to avoid latencies associated with displaying the 3D models 26. Moreover, a render loop can be implemented such that the render loop can optionally employ a 3D rendering component to potentially allow the system (and/or the underlying operating system) to turn off that component, disable the component, and/or power down a 3D GPU, etc., which can lead to power savings.

Figure 3A:
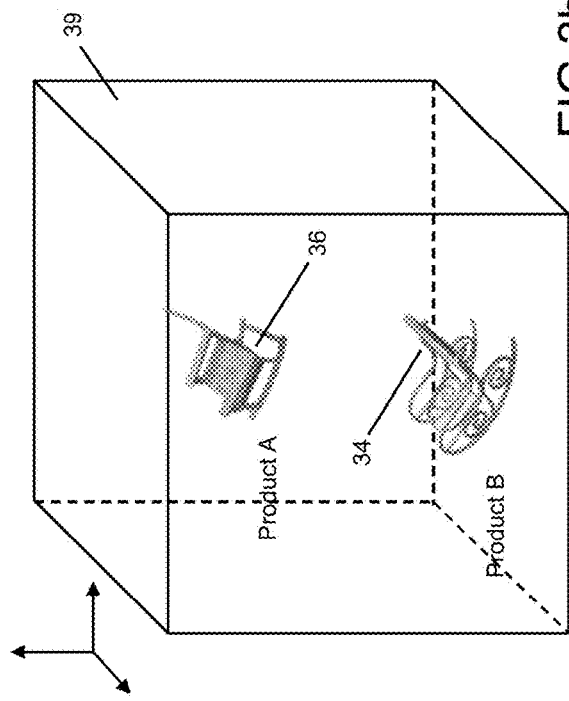
FIGS. 3a to 3d are graphical representations of a 3D environment illustrating individual rotational 3D manipulations in tandem applied to multiple 3D objects without rotating the surrounding environment.
Figure 3B:
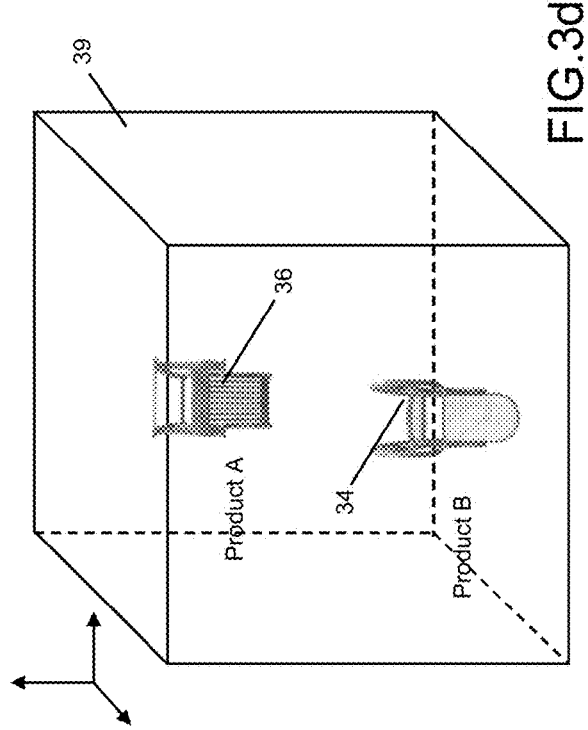
Figure 3C:
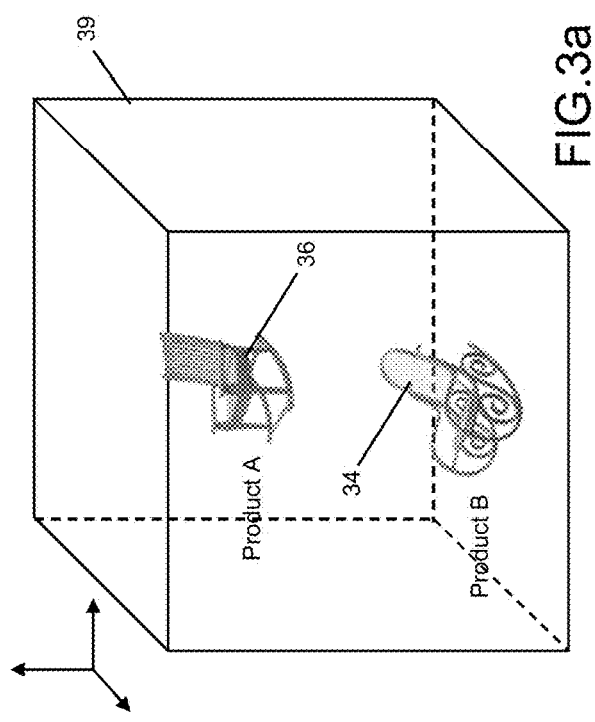
Figure 3D:
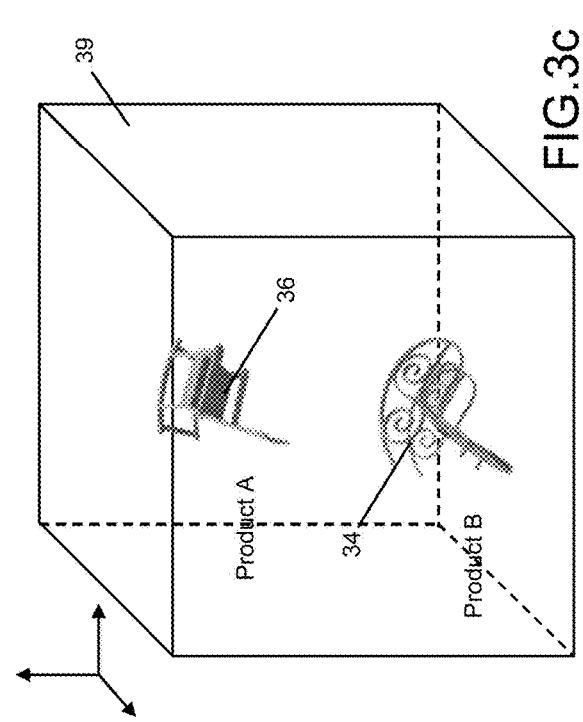

To further illustrate individual tandem 3D manipulations of objects 22 in the same environment, FIGS. 3a-3d illustrate a representative 3D volume 39 containing the first and second objects 34, 36. The volume 39 does not change in orientation with or around the first and second objects 34, 36 but is instead static or stationary while each of the objects 34, 36 rotates or otherwise moves individually (i.e., separately from the volume therearound) but in tandem such that the same manipulation is applied to both the first and second objects 34, 36. This is further illustrated by the product names "Product A" and "Product B" maintaining the same orientation in the volume 29 while the first and second objects 34, 36 are rotated in place about their respective internal axes. The progression from FIG. 3a to FIG. 3b illustrates a rotation from right to left about multiple axes to obtain the same view of the seat surface of each object 34, 36 to enable a comparison of that feature. Similarly, the progression from FIG. 3b to FIG. 3c illustrates a further rotation from right to left or a reverse rotation to view the first and second objects 34, 36 when flipped over. The progression from FIG. 3c to FIG. 3d also illustrates a further rotation that aligns the front of the objects 34, 36 but when flipped over. In each of these views, the Product A and Product B details as well as the orientation of the surrounding environment (i.e., the volume 39) are maintained such that the tandem manipulations are targeted and applied only to the first and second objects 34, 36 rather than applying a first person global rotation that would be applied to the entire volume 39. That is, the first and second objects 34, 36 are individually manipulated/moved (in this case rotated) from the perspective of a user situated within the volume 39, in tandem, such that the same movements are applied at the same time to both the first and second objects 34, 36.

Figure 4B:
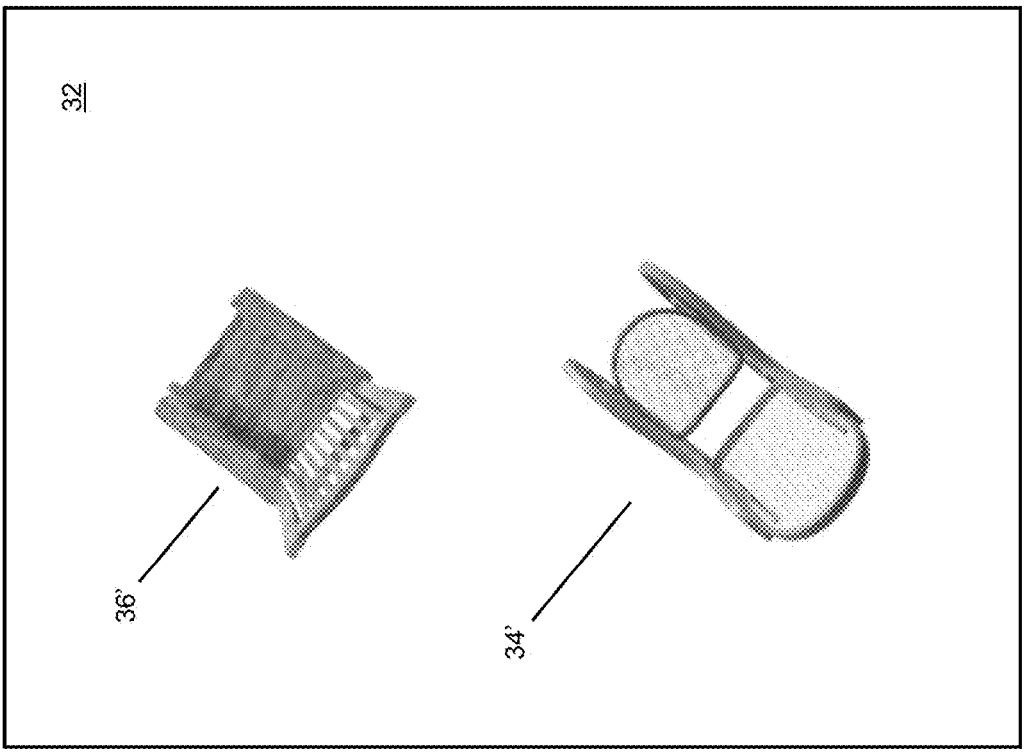
FIG. 4b shows the user interface shown in FIG. 4a in relation to a result of the tandem rotational 3D manipulation about the single axis being applied.
Figure 4A:
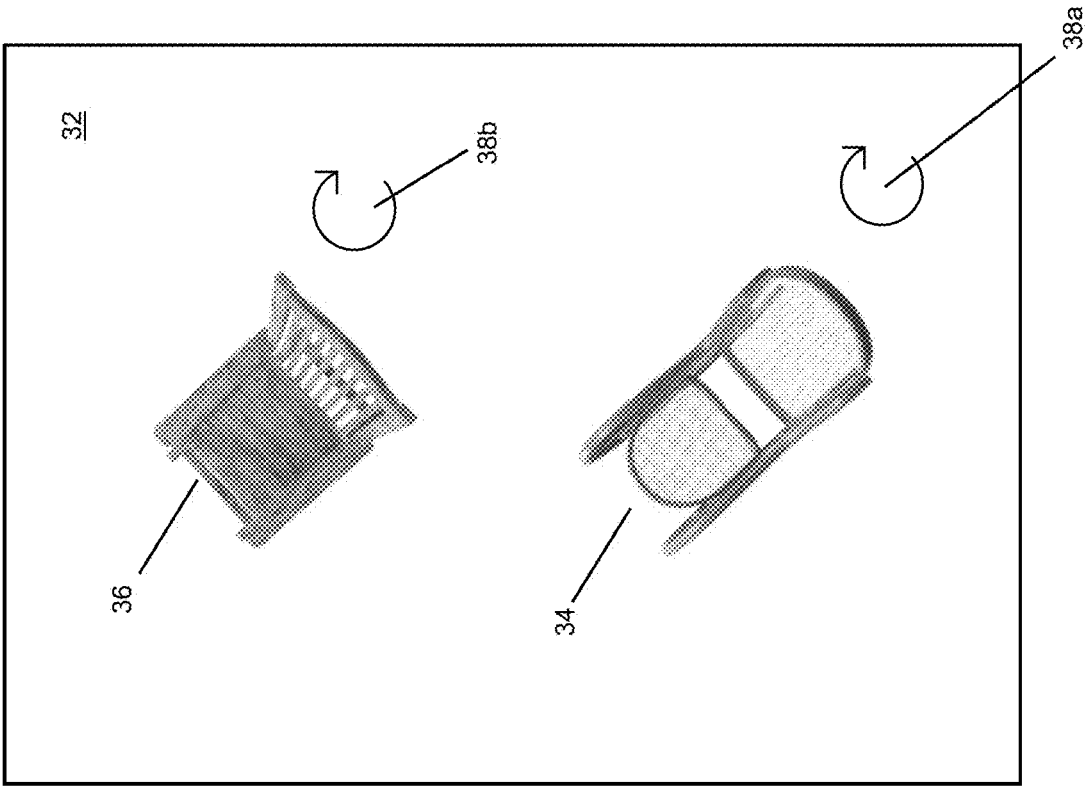
FIG. 4a shows a user interface similar to that shown in FIGS. 2a and 2b, in which a tandem rotational 3D manipulation is being applied about a single axis.

It can be appreciated that while FIGS. 2a, 2b, 3a, and 3b illustrate rotational movements and manipulations about multiple axes, other manipulations are possible. For example, referring to FIGS. 4a and 4b, an applied manipulation input 38a and corresponding tandem manipulation input 38b can be used to apply a rotation about a single axis. In this example, the single rotational axis causes a rotation in the overhead plan view to change from the initial first and second objects 34, 36 to the corresponding manipulated objects 34', 36'. That is, while more complex rotational manipulations are possible in the tandem 3D manipulation mode, simpler manipulations are possible.

Figure 5B:
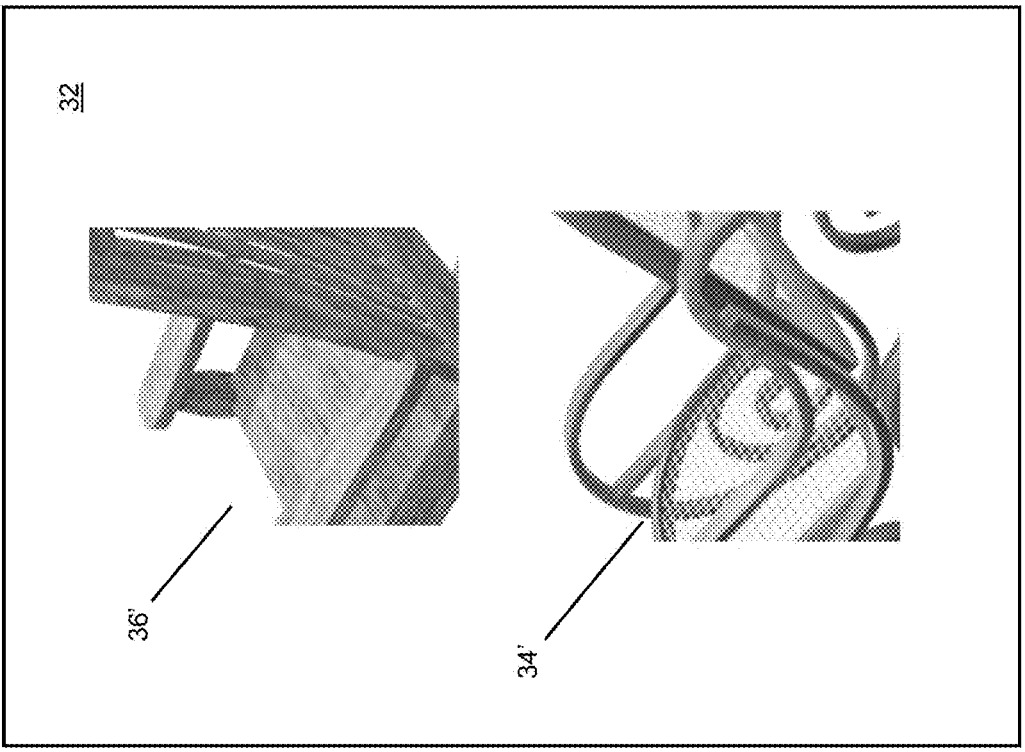
FIG. 5b shows the user interface shown in FIG. 5a in relation to a result of the tandem zoom manipulation being applied.
Figure 5A:
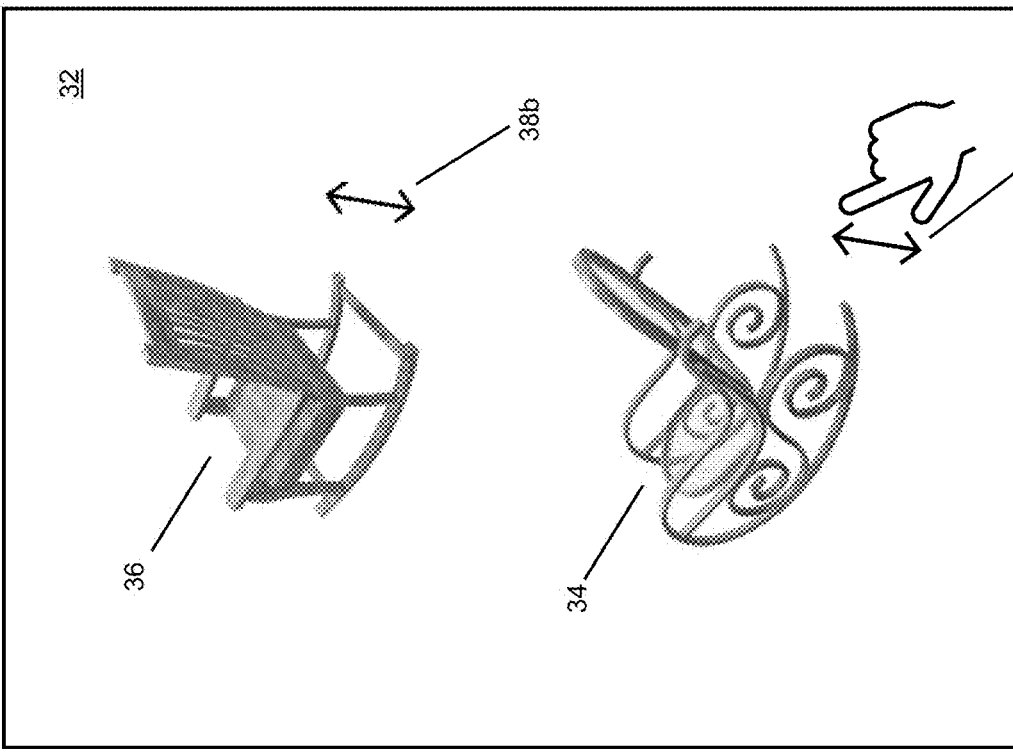
FIG. 5a shows a user interface similar to that shown in FIGS. 2a and 2b, in which a tandem zoom manipulation is being applied to the 3D objects.

As illustrated in FIGS. 5a and 5b, various other movements are possible. In this example, the applied manipulation input 38a corresponds to a "pinch to zoom" manipulation or movement such that the corresponding manipulated objects 34', 36' show the same enlarged portion of the initial first and second objects 34, 36. In this way, the user can rotate or otherwise orient the first and second objects 34, 36 to a desired reference view and then apply a pinch to zoom gesture as the applied manipulation input 38a to zoom in on a desired feature. The tandem manipulation mode can therefore allow users to zoom in on the same feature (or at least similarly positioned feature) of different objects 34, 36 at the same time, without the need to separately interact with the objects individually. As such, fewer inputs and interactions are required of the user, leading to a more user friendly and less complex interaction flow. It can be appreciated that in some embodiments the dimensions of one object relative to another may be used as an input to scale the level of zooming. For example, if the dimensions of the 3D model of one chair object 36 is significantly smaller than the dimensions of the 3D model 34, the level of zoom needed to show the same feature may need to be greater in object 36 so as to frame the feature of interest as equally as possible.

Figure 6B:
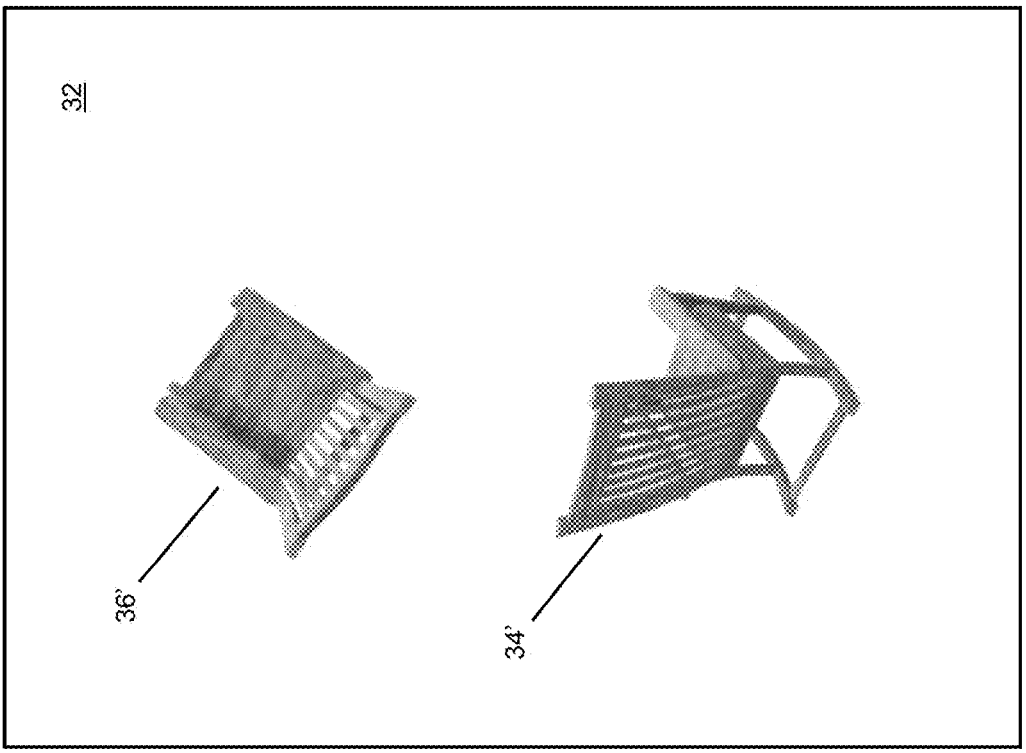
FIG. 6b shows the user interface shown in FIG. 6a in relation to a result of the tandem rotational manipulation being applied to the multiple views of the same 3D object at the same time.
Figure 6A:
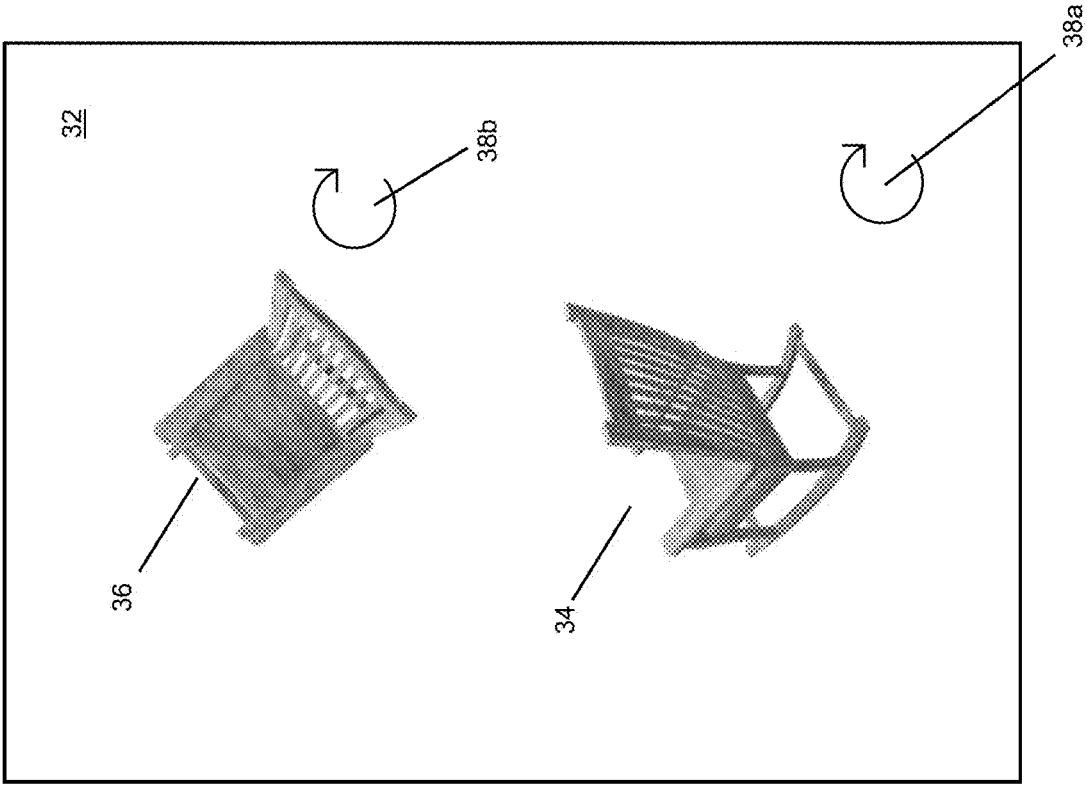
FIG. 6a shows a user interface similar to that shown in FIGS. 2a and 2b, in which a tandem rotational 3D manipulation is being applied to multiple views of the same 3D object at the same time.

Each of the objects 22 can have multiple reference views for the corresponding 3D model 26. In this way, the 3D model 26 can be loaded with different initial viewing angles, e.g., to snap the 3D model view to a desired starting point, or to allow multiple versions of the same 3D model 36 to be displayed together. That is, different reference views of the same object 22 can be viewed together and a tandem 3D manipulation applied to both views at the same time according to the principles discussed herein. Referring to FIG. 6a, in this example, the first object 34 corresponds to a different viewing angle of the same product when compared to the second object 36 (being another viewing angle of that product). By applying a rotational manipulation input 38a to the first object 34, the second object 36 (and thus second view of the same object 22) is rotated similarly but from a different perspective or viewpoint. In this example, as shown in FIG. 6b, the aerial plan view of the chair is rotated to the same extent as the perspective view displayed below it in the UI 32.

Figure 7:
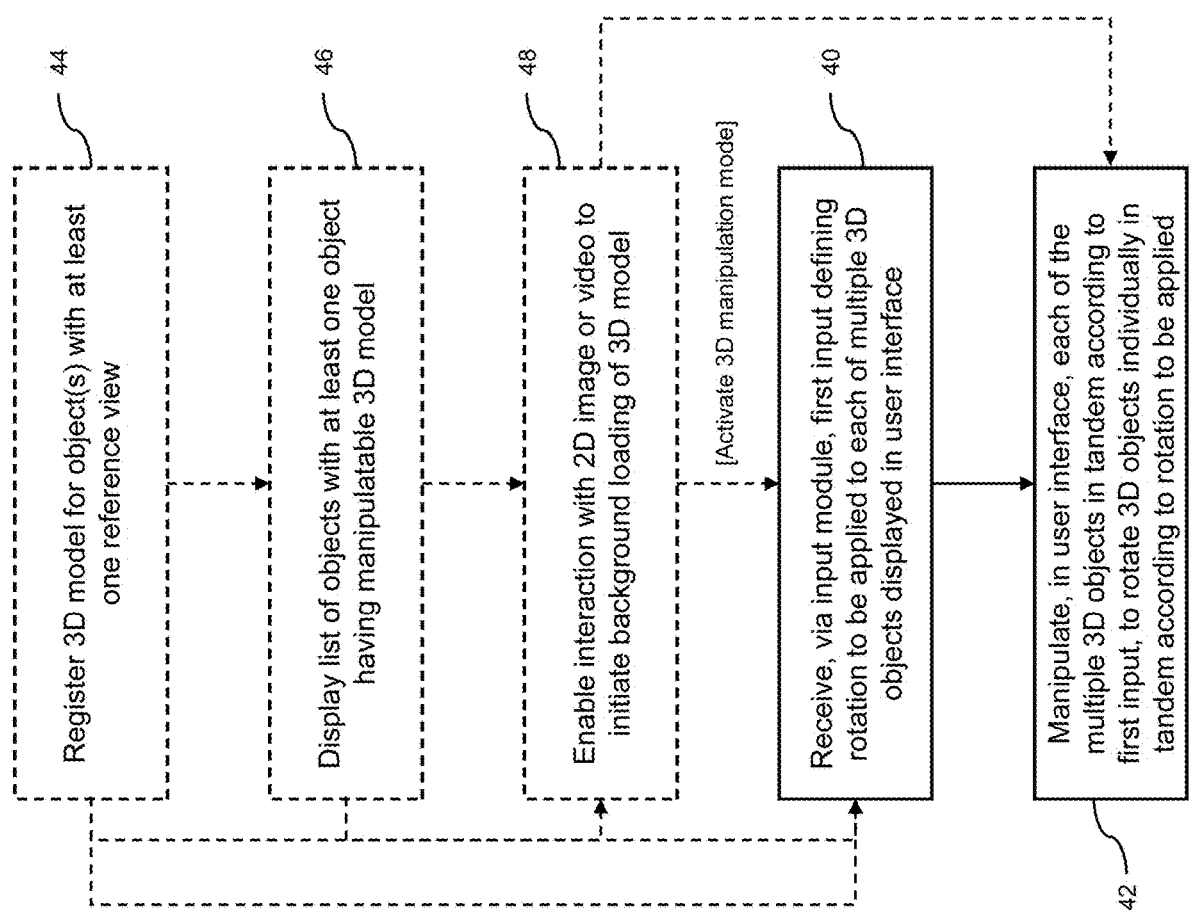
FIG. 7 is a flow chart illustrating an example set of computer executable instructions that can be executed for applying a tandem manipulation to multiple 3D objects being displayed in a user interface.

Referring now to FIG. 7, a flow chart is provided illustrating example computer executable instructions that can be implemented in performing a tandem manipulation of multiple objects in electronic UIs such as the UI 32 illustrated in FIGS. 2-6. At block 40, a first input is received for the UI 32 via an input module. For example, the first input can be detected from an input applied to the UI 32 itself or applied to something displayed in the UI 32 via another input device 16 such as a haptic "tilt" applied to the corresponding electronic device, a voice command, eye tracking command, button, etc. The first input defines a rotation to be applied to each of the multiple 3D objects 22 displayed in the user interface 32. This can include the first input being applied to a 2D image of an object 22 having a corresponding 3D model 26 or an input applied initially to the 3D model 26 when that 3D model 26 has already been loaded and displayed in the UI 32. Optionally, an indication to activate the tandem 3D manipulation mode may be received at or before block 40 as shown with the dashed input arrow in FIG. 7. At block 42, each of the multiple 3D objects is manipulated in the UI 32 in tandem, which is performed according to the first input. In this way, the 3D objects are rotated individually in tandem (as described above) according to the rotation applied. It can be appreciated that while examples herein generally refer to the same or similar extent of manipulation being applied to both objects 34, 36, the tandem 3D manipulation mode can also be configured to apply different amounts or extents of manipulation to different views or objects. For example, in the example shown in FIGS. 6a-6b, the upper plan view could spin more quickly than the rotation applied to the perspective view below.

In addition to receiving the first input and manipulating the 3D objects in blocks 40, 42, certain optional operations can also be performed. For example, at block 44, the 3D data for the objects 22, e.g., the 3D models 26 can be registered with the content providing application 20 so as to determine, define, and store one or more reference views, e.g., if such reference views are not already available to the system. Further detail concerning such a registration is provided below in connection with FIG. 8. Similarly, the tandem manipulation mode applied in blocks 40 and 42 can be initiated from another mode or area/portion of the UI 32. For example, at block 46, a list of objects can be displayed in the UI 32, with at least one of the objects having manipulatable 3D data such as a 3D model 26 that can be loaded, displayed, and manipulated as illustrated in FIGS. 2-6. That is, the first input received in block 40 can include two portions, a first portion that initiates the tandem 3D manipulation mode and a second portion that is associated with applying or defining the rotation to be applied in block 40. The initiation of the tandem 3D manipulation mode can be implemented in several different ways. Different gestures or other inputs can be used to detect such initiation and then to perform the first input in block 40. For example, a first haptic tilt gesture applied to the electronic device can initiate the tandem 3D manipulation mode and a second haptic tilt gesture used to perform the rotation about one or more axes. In another embodiment, different gestures can be used to initiate and utilize/operate the tandem 3D manipulation. Similarly, an input button or prompt can be used to confirm that the user wishes to proceed to a tandem 3D manipulation of the objects being displayed, e.g., to avoid triggering the loading of the 3D models 26 unless the user confirms this mode is desired. Individual objects can also be selected for filtering into a reduced set of objects 22 that enter the tandem 3D manipulation mode such that a first selection is made to identify which objects are to be viewed together and manipulated in tandem before the tandem 3D manipulations are applied. For example, to conserve processing power, only objects 34, 36 currently viewed in the UI 32 may move to the tandem 3D manipulation mode in some implementations. Moreover, an automated filtering operation can be applied such that only those objects 22 being displayed in the UI 32 that have corresponding 3D models 26 move into the tandem 3D manipulation mode.

At block 48, interaction with a 2D image or video corresponding to the object 34, 36 can be enabled to initiate background loading of the 3D model 26, i.e., to utilize the delay load component 30. The delay load process can be initiated from the list of objects displayed in block 46 or from another portion of UI 32 such as an object description, e.g., if initiating the tandem 3D manipulation mode for two views of the same object 22. As shown in alternate dashed lines stemming from block 48, the delay load operation can lead into receiving the first input in block 40 or can itself be considered the first input such that the next operation performed is block 42. It can be appreciated that blocks 44, 46, and 48 (as illustrated using dashed arrowed lines) can be performed individually and out of sequence prior to initiating and/or performing blocks 40 and 42 and need not be performed in the order shown in FIG. 7.

Figure 8:
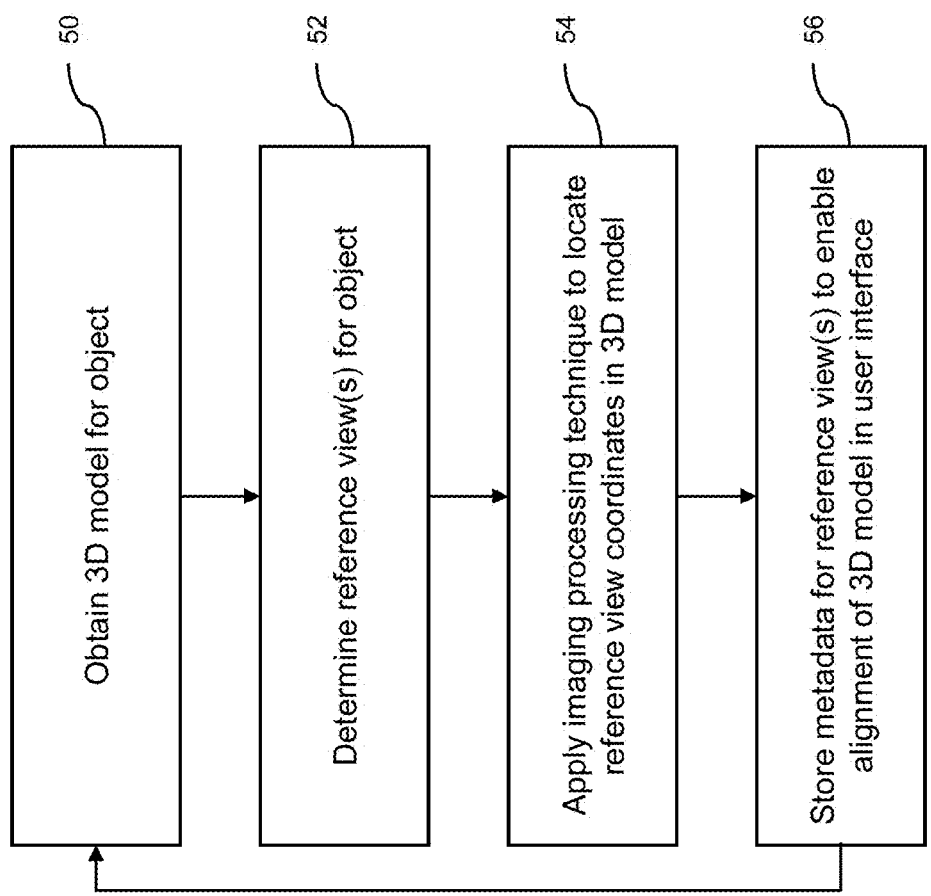
FIG. 8 is a flow chart illustrating an example set of computer executable instructions that can be executed for registering 3D data for objects with at least one reference view.

Referring now to FIG. 8, a flow chart is provided which illustrates example computer executable instructions that can be implemented to register one or more reference views for a 3D model 26 used to perform a tandem 3D manipulation as described herein. At block 50, the object registration component 28 obtains or receives a 3D model 26 for an object 22. At block 52, the object registration component 28 determines one or more reference views for that object 22. For example, the registration process can apply multiple default views or rely on a user or other external input to determine same. That is, the reference view(s) can be determined from any source or input that suggests or requires a viewing angle that can be applied consistently to multiple objects 22 having 3D models 26. As such, the process shown in FIG. 8 can be applied iteratively to multiple objects 22 stored by the content provider application 20. While multiple different reference views can be determined for different stored objects 22, in some implementations, at least one reference view is commonly applied to all stored 3D models 26 to ensure that when compared, the 3D models 26 can snap to or otherwise initiate or default to a same reference view. For example, the two chairs shown in FIG. 2a are aligned such that they have a consistent viewing angle from the viewer's perspective and each displayed object 34, 36 has the same reference view (and corresponding viewing angle) stored and is able to be referenced. This can be done as illustrated in blocks 54 and 56 by applying an image processing technique to locate the reference view desired within the coordinates used by each of the 3D models 26 to normalize or determine an offset that can be applied to the 3D model 26 to achieve the desired reference view. The 3D model 26 can be modified to normalize such coordinates or can determine offsets from the local coordinate system to achieve the same result. At block 56, metadata for the reference view(s) is/are stored to enable the alignment of the 3D models 26 as viewed in the UI 32, e.g., displayed objects 34, 36 shown in FIGS. 2-6.

Figure 9:
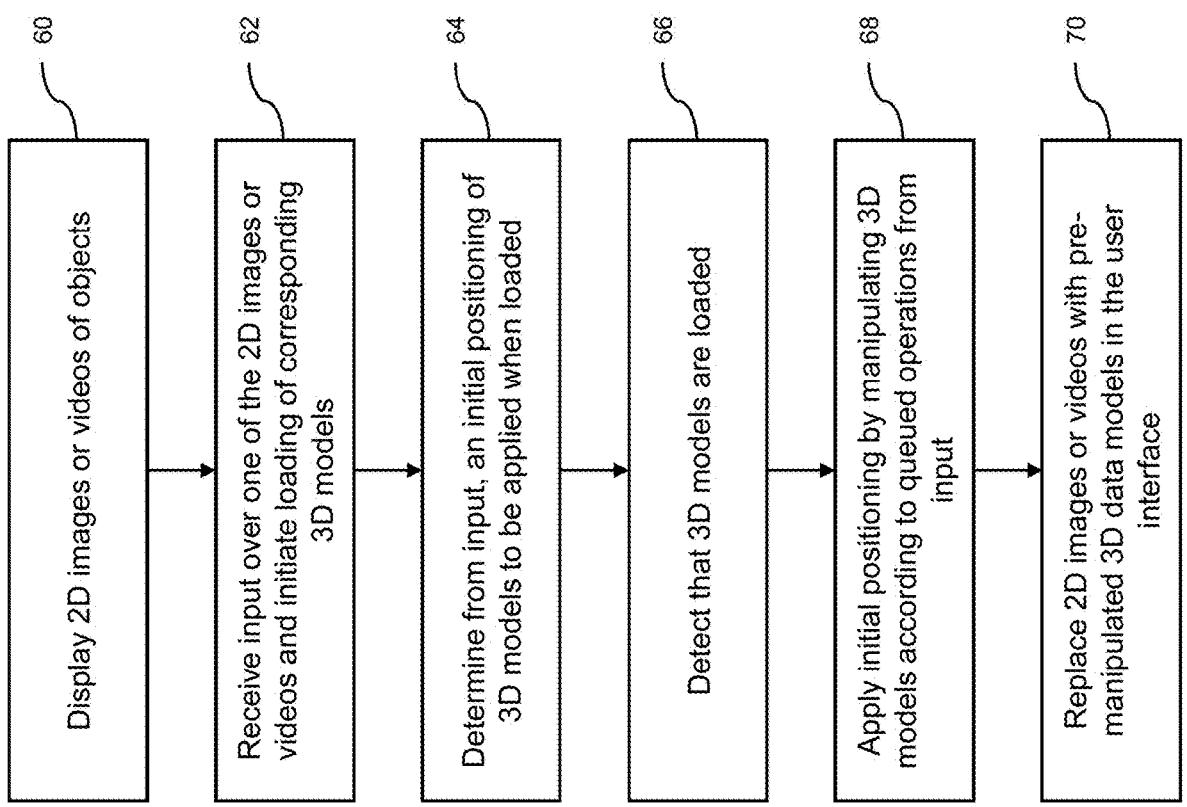
FIG. 9 is a flow chart illustrating an example set of computer executable instructions that can be executed for implementing a delay load operation to account for latencies associated with loading 3D models for the 3D objects.

As discussed above, at block 48 in FIG. 7, the delay load component 28 can be used to enable interaction with a 2D image or video to initiate the background loading of the 3D model(s) 26 to reduce latency in entering the tandem 3D manipulation mode. FIG. 9 provides a flow chart illustrating example computer executable instructions that can be implemented in performing a delay load process. At block 60, for at least two objects 22 to be displayed in the UI 32, 2D images or videos are obtained from the 2D data 24 for the objects 22 and are displayed, e.g., in a search results list as would traditionally be implemented using 2D thumbnails. Common and consistent views of the objects 22 can be shown in the 2D images, for example, a consistent front perspective view, to simplify the transition into the tandem 3D manipulation mode. Similarly, videos displayed instead of or subsequent to displaying the 2D images can include a preview image with the same perspective view. Such videos can be used to animate a gesture that is meant to be applied to the 3D model 26 to further hold the user's attention while the 3D model(s) 26 is/are loaded. This can also be considered masking or distracting from the loading process. It can be appreciated that a progression from a 2D image to a video can also be implemented. Moreover, multiple videos can be stored, one for each of multiple expected inputs applied to perform a tandem 3D manipulation. For example, videos can be pre-recorded showing rotations about the three main axes and loaded according to the detected input, e.g., from a tilt, swipe, voice command, eye tracking input, etc.

Whether beginning from a 2D image or video or progressing from a 2D image to a video, at block 62, the tandem manipulation component 18 or delay load component 30 can detect receipt of an input over one of the 2D images or videos and initiate the loading of corresponding 3D models 26. At block 64, the delay load component 30 determines from the input, an initial positioning of the 3D models 26 to be applied when loaded, to "catch up" to the queued input received at block 62. For example, the user may initiate the tandem 3D manipulation mode by swiping across the displayed object 34 (as shown in FIG. 2a) and the delay load component 30 can determine an extent associated with the swipe and correlate that to an expected amount of rotation that would be applied to the 3D model 26 had the same input been applied directly to the 3D model 26 when loaded. Once the delay load component 30 detects at block 66 that the 3D models 26 have been loaded, an initial positioning can be applied at block 68 by manipulating the 3D models 26 according to the queued operations from the input received so as to catch up or snap to the initial positioning that the user was intending to view. At block 70, the delay load component 30 can have the tandem manipulation component 18 replace the 2D images and/or videos with the pre-manipulated 3D data models 26 in the user interface 32. In this way, the delay load component 30 can hold the user's attention or provide a distraction that hides or masks any delay occurring in the background while the 3D model 26 is being loaded. It can be appreciated that the operations shown in FIG. 9 can be selectively applied or not depending on the size of the 3D data model files, the processing power available and the number of 3D data models 26 requested.

The tandem manipulation component 18 and other components shown in FIG. 1 can be implemented in any computing environment 10 in which a UI 32 is rendered on a display 14 and any suitable input 16 can be detected and correlated to a desired 3D manipulation of a displayed object 34, 36. As discussed above, one particular implementation of the tandem 3D manipulation mode is in a search results or catalogue listing of objects 22 provided by the content provider application 20. Such search results can be generated in a variety of contexts, scenarios and applications, including within an e-commerce setting whether on an e-commerce website or app, or via an e-commerce component of a 2D or 3D (e.g., virtual or augmented reality) environment, including gaming user interfaces or 3D worlds. Such implementations may require an integration with a platform used for such purposes, including e-commerce platforms.

An Example e-Commerce Platform

Although integration with a commerce platform is not required, in some embodiments, the methods disclosed herein may be performed on or in association with a commerce platform such as an e-commerce platform. Therefore, an example of a commerce platform will be described.

Figure 10:
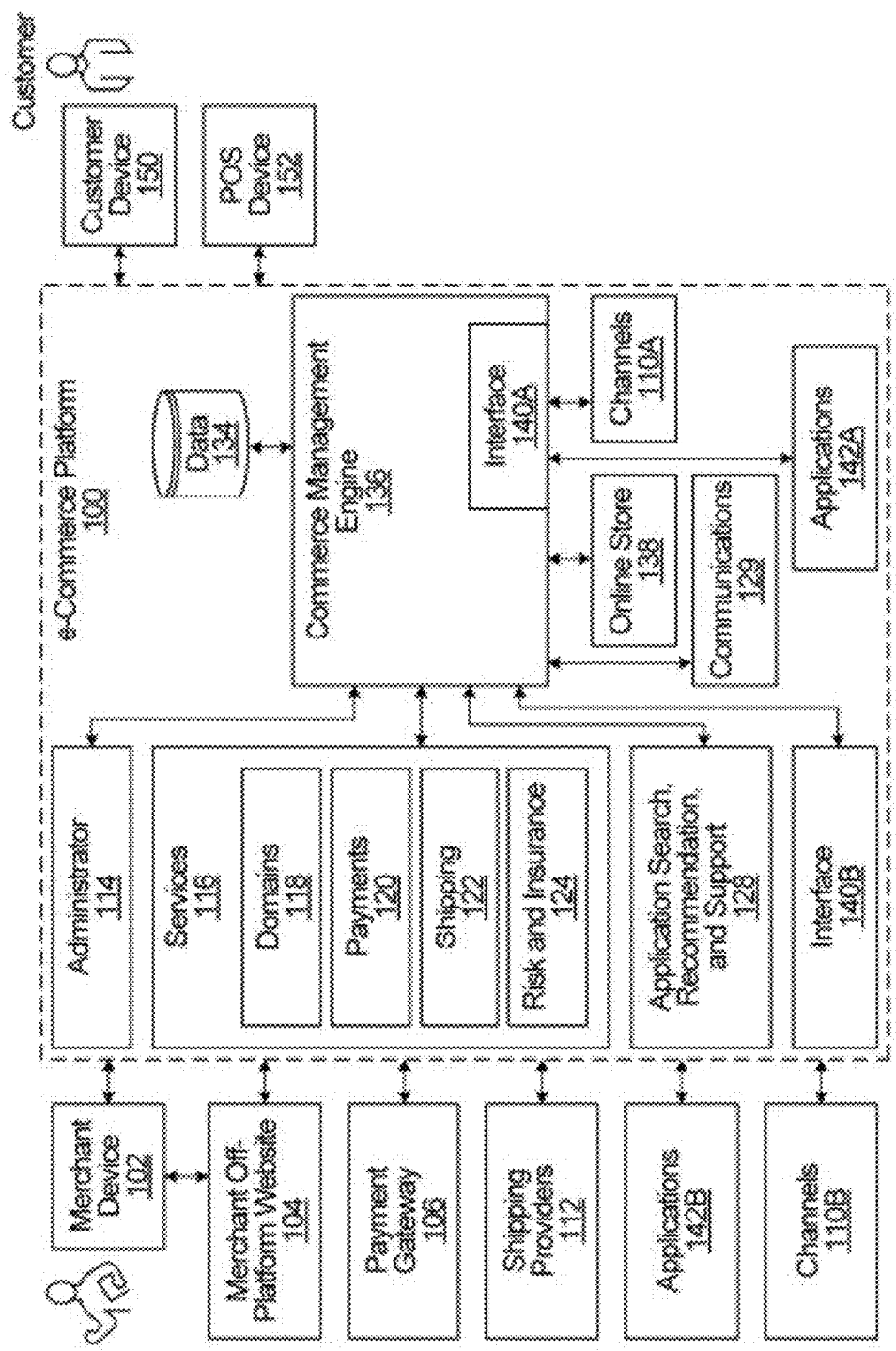
FIG. 10 is a block diagram illustrating an example of a configuration for an e-commerce platform.

FIG. 10 illustrates an example e-commerce platform 100, according to one embodiment. The e-commerce platform 100 may be used to provide merchant products and services to customers. While the disclosure contemplates using the apparatus, system, and process to purchase products and services, for simplicity the description herein will refer to products. All references to products throughout this disclosure should also be understood to be references to products and/or services, including, for example, physical products, digital content (e.g., music, videos, games), software, tickets, subscriptions, services to be provided, and the like.

While the disclosure throughout contemplates that a 'merchant' and a 'customer' may be more than individuals, for simplicity the description herein may generally refer to merchants and customers as such. All references to merchants and customers throughout this disclosure should also be understood to be references to groups of individuals, companies, corporations, computing entities, and the like, and may represent for-profit or not-for-profit exchange of products. Further, while the disclosure throughout refers to 'merchants' and 'customers', and describes their roles as such, the e-commerce platform 100 should be understood to more generally support users in an e-commerce environment, and all references to merchants and customers throughout this disclosure should also be understood to be references to users, such as where a user is a merchant-user (e.g., a seller, retailer, wholesaler, or provider of products), a customer-user (e.g., a buyer, purchase agent, consumer, or user of products), a prospective user (e.g., a user browsing and not yet committed to a purchase, a user evaluating the e-commerce platform 100 for potential use in marketing and selling products, and the like), a service provider user (e.g., a shipping provider 112, a financial provider, and the like), a company or corporate user (e.g., a company representative for purchase, sales, or use of products); an enterprise user; a customer relations or customer management agent, and the like), an information technology user, a computing entity user (e.g., a computing bot for purchase, sales, or use of products), and the like. Furthermore, it may be recognized that while a given user may act in a given role (e.g., as a merchant) and their associated device may be referred to accordingly (e.g., as a merchant device) in one context, that same individual may act in a different role in another context (e.g., as a customer) and that same or another associated device may be referred to accordingly (e.g., as a customer device). For example, an individual may be a merchant for one type of product (e.g., shoes), and a customer/consumer of other types of products (e.g., groceries). In another example, an individual may be both a consumer and a merchant of the same type of product. In a particular example, a merchant that trades in a particular category of goods may act as a customer for that same category of goods when they order from a wholesaler (the wholesaler acting as merchant).

The e-commerce platform 100 provides merchants with online services/facilities to manage their business. The facilities described herein are shown implemented as part of the platform 100 but could also be configured separately from the platform 100, in whole or in part, as stand-alone services. Furthermore, such facilities may, in some embodiments, may, additionally or alternatively, be provided by one or more providers/entities.

In the example of FIG. 10, the facilities are deployed through a machine, service or engine that executes computer software, modules, program codes, and/or instructions on one or more processors which, as noted above, may be part of or external to the platform 100. Merchants may utilize the e-commerce platform 100 for enabling or managing commerce with customers, such as by implementing an e-commerce experience with customers through an online store 138, applications 142A-B, channels 110A-B, and/or through point of sale (POS) devices 152 in physical locations (e.g., a physical storefront or other location such as through a kiosk, terminal, reader, printer, 3D printer, and the like). A merchant may utilize the e-commerce platform 100 as a sole commerce presence with customers, or in conjunction with other merchant commerce facilities, such as through a physical store (e.g., 'brick-and-mortar' retail stores), a merchant off-platform website 104 (e.g., a commerce Internet website or other internet or web property or asset supported by or on behalf of the merchant separately from the e-commerce platform 100), an application 142B, and the like. However, even these 'other' merchant commerce facilities may be incorporated into or communicate with the e-commerce platform 100, such as where POS devices 152 in a physical store of a merchant are linked into the e-commerce platform 100, where a merchant off-platform website 104 is tied into the e-commerce platform 100, such as, for example, through 'buy buttons' that link content from the merchant off platform website 104 to the online store 138, or the like.

The online store 138 may represent a multi-tenant facility comprising a plurality of virtual storefronts. In embodiments, merchants may configure and/or manage one or more storefronts in the online store 138, such as, for example, through a merchant device 102 (e.g., computer, laptop computer, mobile computing device, and the like), and offer products to customers through a number of different channels 110A-B (e.g., an online store 138; an application 142A-B; a physical storefront through a POS device 152; an electronic marketplace, such, for example, through an electronic buy button integrated into a website or social media channel such as on a social network, social media page, social media messaging system; and/or the like). A merchant may sell across channels 110A-B and then manage their sales through the e-commerce platform 100, where channels 110A may be provided as a facility or service internal or external to the e-commerce platform 100. A merchant may, additionally or alternatively, sell in their physical retail store, at pop ups, through wholesale, over the phone, and the like, and then manage their sales through the e-commerce platform 100. A merchant may employ all or any combination of these operational modalities. Notably, it may be that by employing a variety of and/or a particular combination of modalities, a merchant may improve the probability and/or volume of sales. Throughout this disclosure the terms online store 138 and storefront may be used synonymously to refer to a merchant's online e-commerce service offering through the e-commerce platform 100, where an online store 138 may refer either to a collection of storefronts supported by the e-commerce platform 100 (e.g., for one or a plurality of merchants) or to an individual merchant's storefront (e.g., a merchant's online store).

In some embodiments, a customer may interact with the platform 100 through a customer device 150 (e.g., computer, laptop computer, mobile computing device, or the like), a POS device 152 (e.g., retail device, kiosk, automated (self-service) checkout system, or the like), and/or any other commerce interface device known in the art. The e-commerce platform 100 may enable merchants to reach customers through the online store 138, through applications 142A-B, through POS devices 152 in physical locations (e.g., a merchant's storefront or elsewhere), to communicate with customers via electronic communication facility 129, and/or the like so as to provide a system for reaching customers and facilitating merchant services for the real or virtual pathways available for reaching and interacting with customers.

In some embodiments, and as described further herein, the e-commerce platform 100 may be implemented through a processing facility. Such a processing facility may include a processor and a memory. The processor may be a hardware processor. The memory may be and/or may include a non-transitory computer-readable medium. The memory may be and/or may include random access memory (RAM) and/or persisted storage (e.g., magnetic storage). The processing facility may store a set of instructions (e.g., in the memory) that, when executed, cause the e-commerce platform 100 to perform the e-commerce and support functions as described herein. The processing facility may be or may be a part of one or more of a server, client, network infrastructure, mobile computing platform, cloud computing platform, stationary computing platform, and/or some other computing platform, and may provide electronic connectivity and communications between and amongst the components of the e-commerce platform 100, merchant devices 102, payment gateways 106, applications 142A-B, channels 110A-B, shipping providers 112, customer devices 150, point of sale devices 152, etc. . . . In some implementations, the processing facility may be or may include one or more such computing devices acting in concert. For example, it may be that a plurality of co-operating computing devices serves as/to provide the processing facility. The e-commerce platform 100 may be implemented as or using one or more of a cloud computing service, software as a service (SaaS), infrastructure as a service (IaaS), platform as a service (PaaS), desktop as a service (DaaS), managed software as a service (MSaaS), mobile backend as a service (MBaaS), information technology management as a service (ITMaaS), and/or the like. For example, it may be that the underlying software implementing the facilities described herein (e.g., the online store 138) is provided as a service, and is centrally hosted (e.g., and then accessed by users via a web browser or other application, and/or through customer devices 150, POS devices 152, and/or the like). In some embodiments, elements of the e-commerce platform 100 may be implemented to operate and/or integrate with various other platforms and operating systems.

In some embodiments, the facilities of the e-commerce platform 100 (e.g., the online store 138) may serve content to a customer device 150 (using data 134) such as, for example, through a network connected to the e-commerce platform 100. For example, the online store 138 may serve or send content in response to requests for data 134 from the customer device 150, where a browser (or other application) connects to the online store 138 through a network using a network communication protocol (e.g., an internet protocol). The content may be written in machine readable language and may include Hypertext Markup Language (HTML), template language, JavaScript, and the like, and/or any combination thereof.

In some embodiments, online store 138 may be or may include service instances that serve content to customer devices and allow customers to browse and purchase the various products available (e.g., add them to a cart, purchase through a buy-button, and the like). Merchants may also customize the look and feel of their website through a theme system, such as, for example, a theme system where merchants can select and change the look and feel of their online store 138 by changing their theme while having the same underlying product and business data shown within the online store's product information. It may be that themes can be further customized through a theme editor, a design interface that enables users to customize their website's design with flexibility. Additionally or alternatively, it may be that themes can, additionally or alternatively, be customized using theme-specific settings such as, for example, settings as may change aspects of a given theme, such as, for example, specific colors, fonts, and pre-built layout schemes. In some implementations, the online store may implement a content management system for website content. Merchants may employ such a content management system in authoring blog posts or static pages and publish them to their online store 138, such as through blogs, articles, landing pages, and the like, as well as configure navigation menus. Merchants may upload images (e.g., for products), video, content, data, and the like to the e-commerce platform 100, such as for storage by the system (e.g., as data 134). In some embodiments, the e-commerce platform 100 may provide functions for manipulating such images and content such as, for example, functions for resizing images, associating an image with a product, adding and associating text with an image, adding an image for a new product variant, protecting images, and the like.

As described herein, the e-commerce platform 100 may provide merchants with sales and marketing services for products through a number of different channels 110A-B, including, for example, the online store 138, applications 142A-B, as well as through physical POS devices 152 as described herein. The e-commerce platform 100 may, additionally or alternatively, include business support services 116, an administrator 114, a warehouse management system, and the like associated with running an on-line business, such as, for example, one or more of providing a domain registration service 118 associated with their online store, payment services 120 for facilitating transactions with a customer, shipping services 122 for providing customer shipping options for purchased products, fulfillment services for managing inventory, risk and insurance services 124 associated with product protection and liability, merchant billing, and the like. Services 116 may be provided via the e-commerce platform 100 or in association with external facilities, such as through a payment gateway 106 for payment processing, shipping providers 112 for expediting the shipment of products, and the like.

In some embodiments, the e-commerce platform 100 may be configured with shipping services 122 (e.g., through an e-commerce platform shipping facility or through a third-party shipping carrier), to provide various shipping-related information to merchants and/or their customers such as, for example, shipping label or rate information, real-time delivery updates, tracking, and/or the like.

Figure 11:
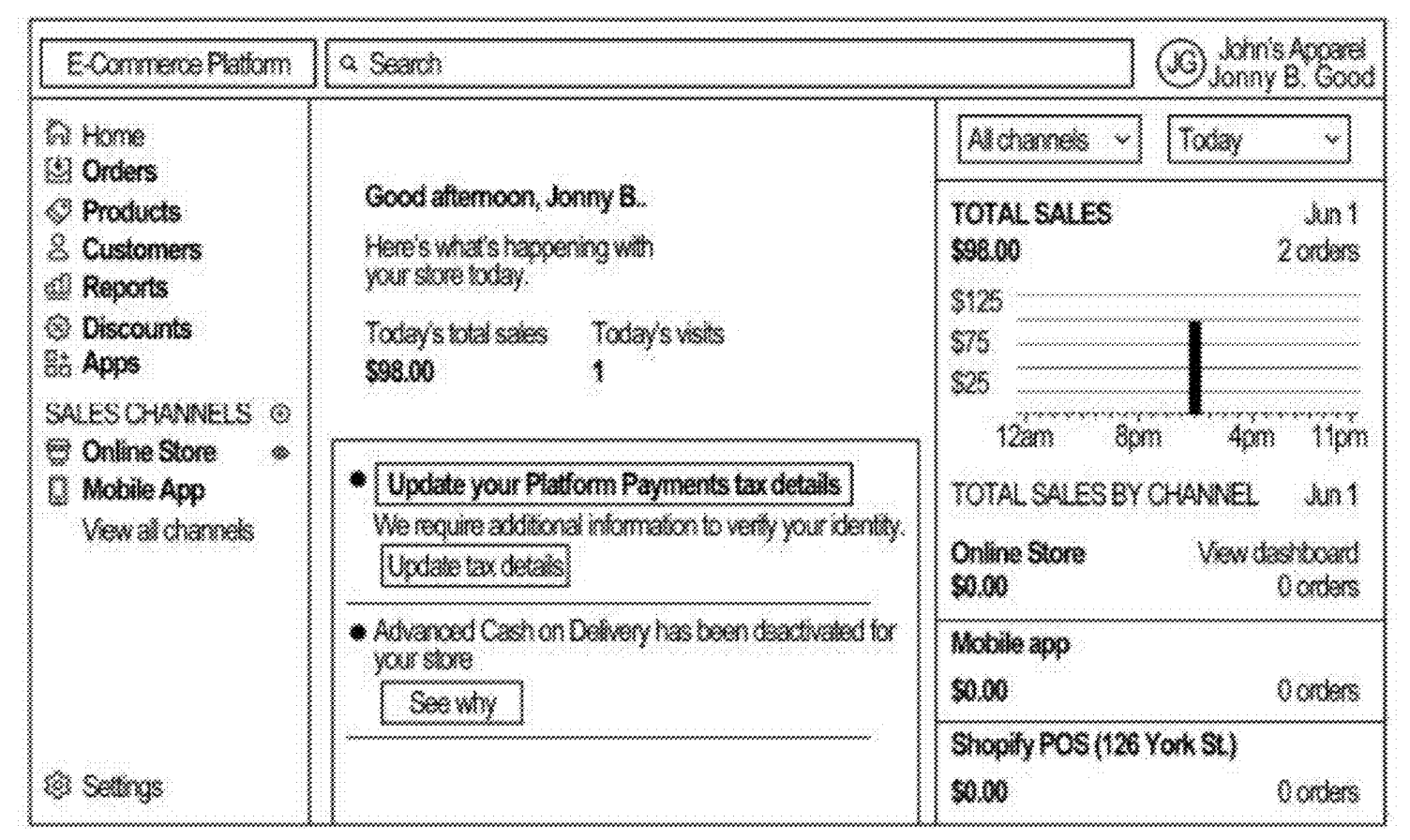

FIG. 11 depicts a non-limiting embodiment for a home page of an administrator 114. The administrator 114 may be referred to as an administrative console and/or an administrator console. The administrator 114 may show information about daily tasks, a store's recent activity, and the next steps a merchant can take to build their business. In some embodiments, a merchant may log in to the administrator 114 via a merchant device 102 (e.g., a desktop computer or mobile device), and manage aspects of their online store 138, such as, for example, viewing the online store's 138 recent visit or order activity, updating the online store's 138 catalog, managing orders, and/or the like. In some embodiments, the merchant may be able to access the different sections of the administrator 114 by using a sidebar, such as the one shown on FIG. 11. Sections of the administrator 114 may include various interfaces for accessing and managing core aspects of a merchant's business, including orders, products, customers, available reports and discounts. The administrator 114 may, additionally or alternatively, include interfaces for managing sales channels for a store including the online store 138, mobile application(s) made available to customers for accessing the store (Mobile App), POS devices, and/or a buy button. The administrator 114 may, additionally or alternatively, include interfaces for managing applications (apps) installed on the merchant's account; and settings applied to a merchant's online store 138 and account. A merchant may use a search bar to find products, pages, or other information in their store.

More detailed information about commerce and visitors to a merchant's online store 138 may be viewed through reports or metrics. Reports may include, for example, acquisition reports, behavior reports, customer reports, finance reports, marketing reports, sales reports, product reports, and custom reports. The merchant may be able to view sales data for different channels 110A-B from different periods of time (e.g., days, weeks, months, and the like), such as by using drop-down menus. An overview dashboard may also be provided for a merchant who wants a more detailed view of the store's sales and engagement data. An activity feed in the home metrics section may be provided to illustrate an overview of the activity on the merchant's account. For example, by clicking on a 'view all recent activity' dashboard button, the merchant may be able to see a longer feed of recent activity on their account. A home page may show notifications about the merchant's online store 138, such as based on account status, growth, recent customer activity, order updates, and the like. Notifications may be provided to assist a merchant with navigating through workflows configured for the online store 138, such as, for example, a payment workflow, an order fulfillment workflow, an order archiving workflow, a return workflow, and the like.

The e-commerce platform 100 may provide for a communications facility 129 and associated merchant interface for providing electronic communications and marketing, such as utilizing an electronic messaging facility for collecting and analyzing communication interactions between merchants, customers, merchant devices 102, customer devices 150, POS devices 152, and the like, to aggregate and analyze the communications, such as for increasing sale conversions, and the like. For instance, a customer may have a question related to a product, which may produce a dialog between the customer and the merchant (or an automated processor-based agent/chatbot representing the merchant), where the communications facility 129 is configured to provide automated responses to customer requests and/or provide recommendations to the merchant on how to respond such as, for example, to improve the probability of a sale.

The e-commerce platform 100 may provide a financial facility 120 for secure financial transactions with customers, such as through a secure card server environment. The e-commerce platform 100 may store credit card information, such as in payment card industry data (PCI) environments (e.g., a card server), to reconcile financials, bill merchants, perform automated clearing house (ACH) transfers between the e-commerce platform 100 and a merchant's bank account, and the like. The financial facility 120 may also provide merchants and buyers with financial support, such as through the lending of capital (e.g., lending funds, cash advances, and the like) and provision of insurance. In some embodiments, online store 138 may support a number of independently administered storefronts and process a large volume of transactional data on a daily basis for a variety of products and services. Transactional data may include any customer information indicative of a customer, a customer account or transactions carried out by a customer such as, for example, contact information, billing information, shipping information, returns/refund information, discount/offer information, payment information, or online store events or information such as page views, product search information (search keywords, click-through events), product reviews, abandoned carts, and/or other transactional information associated with business through the e-commerce platform 100. In some embodiments, the e-commerce platform 100 may store this data in a data facility 134. Referring again to FIG. 10, in some embodiments the e-commerce platform 100 may include a commerce management engine 136 such as may be configured to perform various workflows for task automation or content management related to products, inventory, customers, orders, suppliers, reports, financials, risk and fraud, and the like. In some embodiments, additional functionality may, additionally or alternatively, be provided through applications 142A-B to enable greater flexibility and customization required for accommodating an ever-growing variety of online stores, POS devices, products, and/or services. Applications 142A may be components of the e-commerce platform 100 whereas applications 142B may be provided or hosted as a third-party service external to e-commerce platform 100. The commerce management engine 136 may accommodate store-specific workflows and in some embodiments, may incorporate the administrator 114 and/or the online store 138.

Implementing functions as applications 142A-B may enable the commerce management engine 136 to remain responsive and reduce or avoid service degradation or more serious infrastructure failures, and the like.

Although isolating online store data can be important to maintaining data privacy between online stores 138 and merchants, there may be reasons for collecting and using cross-store data, such as for example, with an order risk assessment system or a platform payment facility, both of which require information from multiple online stores 138 to perform well. In some embodiments, it may be preferable to move these components out of the commerce management engine 136 and into their own infrastructure within the e-commerce platform 100.

Platform payment facility 120 is an example of a component that utilizes data from the commerce management engine 136 but is implemented as a separate component or service. The platform payment facility 120 may allow customers interacting with online stores 138 to have their payment information stored safely by the commerce management engine 136 such that they only have to enter it once. When a customer visits a different online store 138, even if they have never been there before, the platform payment facility 120 may recall their information to enable a more rapid and/or potentially less-error prone (e.g., through avoidance of possible mis-keying of their information if they needed to instead re-enter it) checkout. This may provide a cross-platform network effect, where the e-commerce platform 100 becomes more useful to its merchants and buyers as more merchants and buyers join, such as because there are more customers who checkout more often because of the ease of use with respect to customer purchases. To maximize the effect of this network, payment information for a given customer may be retrievable and made available globally across multiple online stores 138.

For functions that are not included within the commerce management engine 136, applications 142A-B provide a way to add features to the e-commerce platform 100 or individual online stores 138. For example, applications 142A-B may be able to access and modify data on a merchant's online store 138, perform tasks through the administrator 114, implement new flows for a merchant through a user interface (e.g., that is surfaced through extensions/API), and the like. Merchants may be enabled to discover and install applications 142A-B through application search, recommendations, and support 128. In some embodiments, the commerce management engine 136, applications 142A-B, and the administrator 114 may be developed to work together. For instance, application extension points may be built inside the commerce management engine 136, accessed by applications 142A and 142B through the interfaces 140B and 140A to deliver additional functionality, and surfaced to the merchant in the user interface of the administrator 114.

In some embodiments, applications 142A-B may deliver functionality to a merchant through the interface 140A-B, such as where an application 142A-B is able to surface transaction data to a merchant (e.g., App: "Engine, surface my app data in the Mobile App or administrator 114"), and/or where the commerce management engine 136 is able to ask the application to perform work on demand (Engine: "App, give me a local tax calculation for this checkout").

Applications 142A-B may be connected to the commerce management engine 136 through an interface 140A-B (e.g., through REST (REpresentational State Transfer) and/or GraphQL APIs) to expose the functionality and/or data available through and within the commerce management engine 136 to the functionality of applications. For instance, the e-commerce platform 100 may provide API interfaces 140A-B to applications 142A-B which may connect to products and services external to the platform 100. The flexibility offered through use of applications and APIs (e.g., as offered for application development) enable the e-commerce platform 100 to better accommodate new and unique needs of merchants or to address specific use cases without requiring constant change to the commerce management engine 136. For instance, shipping services 122 may be integrated with the commerce management engine 136 through a shipping or carrier service API, thus enabling the e-commerce platform 100 to provide shipping service functionality without directly impacting code running in the commerce management engine 136.

Depending on the implementation, applications 142A-B may utilize APIs to pull data on demand (e.g., customer creation events, product change events, or order cancelation events, etc.) or have the data pushed when updates occur. A subscription model may be used to provide applications 142A-B with events as they occur or to provide updates with respect to a changed state of the commerce management engine 136. In some embodiments, when a change related to an update event subscription occurs, the commerce management engine 136 may post a request, such as to a predefined callback URL. The body of this request may contain a new state of the object and a description of the action or event. Update event subscriptions may be created manually, in the administrator facility 114, or automatically (e.g., via the API 140A-B). In some embodiments, update events may be queued and processed asynchronously from a state change that triggered them, which may produce an update event notification that is not distributed in real-time or near-real time.

In some embodiments, the e-commerce platform 100 may provide one or more of application search, recommendation and support 128. Application search, recommendation and support 128 may include developer products and tools to aid in the development of applications, an application dashboard (e.g., to provide developers with a development interface, to administrators for management of applications, to merchants for customization of applications, and the like), facilities for installing and providing permissions with respect to providing access to an application 142A-B (e.g., for public access, such as where criteria must be met before being installed, or for private use by a merchant), application searching to make it easy for a merchant to search for applications 142A-B that satisfy a need for their online store 138, application recommendations to provide merchants with suggestions on how they can improve the user experience through their online store 138, and the like. In some embodiments, applications 142A-B may be assigned an application identifier (ID), such as for linking to an application (e.g., through an API), searching for an application, making application recommendations, and the like.

Applications 142A-B may be grouped roughly into three categories: customer-facing applications, merchant-facing applications, integration applications, and the like. Customer-facing applications 142A-B may include an online store 138 or channels 110A-B that are places where merchants can list products and have them purchased (e.g., the online store, applications for flash sales (e.g., merchant products or from opportunistic sales opportunities from third-party sources), a mobile store application, a social media channel, an application for providing wholesale purchasing, and the like). Merchant-facing applications 142A-B may include applications that allow the merchant to administer their online store 138 (e.g., through applications related to the web or website or to mobile devices), run their business (e.g., through applications related to POS devices), to grow their business (e.g., through applications related to shipping (e.g., drop shipping), use of automated agents, use of process flow development and improvements), and the like. Integration applications may include applications that provide useful integrations that participate in the running of a business, such as shipping providers 112 and payment gateways 106.

As such, the e-commerce platform 100 can be configured to provide an online shopping experience through a flexible system architecture that enables merchants to connect with customers in a flexible and transparent manner. A typical customer experience may be better understood through an embodiment example purchase workflow, where the customer browses the merchant's products on a channel 110A-B, adds what they intend to buy to their cart, proceeds to checkout, and pays for the content of their cart resulting in the creation of an order for the merchant. The merchant may then review and fulfill (or cancel) the order. The product is then delivered to the customer. If the customer is not satisfied, they might return the products to the merchant.

In an example embodiment, a customer may browse a merchant's products through a number of different channels 110A-B such as, for example, the merchant's online store 138, a physical storefront through a POS device 152; an electronic marketplace, through an electronic buy button integrated into a website or a social media channel). In some cases, channels 110A-B may be modeled as applications 142A-B A merchandising component in the commerce management engine 136 may be configured for creating, and managing product listings (using product data objects or models for example) to allow merchants to describe what they want to sell and where they sell it. The association between a product listing and a channel may be modeled as a product publication and accessed by channel applications, such as via a product listing API. A product may have many attributes and/or characteristics, like size and color, and many variants that expand the available options into specific combinations of all the attributes, like a variant that is size extra-small and green, or a variant that is size large and blue. Products may have at least one variant (e.g., a "default variant") created for a product without any options. To facilitate browsing and management, products may be grouped into collections, provided product identifiers (e.g., stock keeping unit (SKU)) and the like. Collections of products may be built by either manually categorizing products into one (e.g., a custom collection), by building rulesets for automatic classification (e.g., a smart collection), and the like. Product listings may include 2D images, 3D images or models, which may be viewed through a virtual or augmented reality interface, and the like.

In some embodiments, a shopping cart object is used to store or keep track of the products that the customer intends to buy. The shopping cart object may be channel specific and can be composed of multiple cart line items, where each cart line item tracks the quantity for a particular product variant. Since adding a product to a cart does not imply any commitment from the customer or the merchant, and the expected lifespan of a cart may be in the order of minutes (not days), cart objects/data representing a cart may be persisted to an ephemeral data store.

The customer then proceeds to checkout. A checkout object or page generated by the commerce management engine 136 may be configured to receive customer information to complete the order such as the customer's contact information, billing information and/or shipping details. If the customer inputs their contact information but does not proceed to payment, the e-commerce platform 100 may (e.g., via an abandoned checkout component) to transmit a message to the customer device 150 to encourage the customer to complete the checkout. For those reasons, checkout objects can have much longer lifespans than cart objects (hours or even days) and may therefore be persisted. Customers then pay for the content of their cart resulting in the creation of an order for the merchant. In some embodiments, the commerce management engine 136 may be configured to communicate with various payment gateways and services 106 (e.g., online payment systems, mobile payment systems, digital wallets, credit card gateways) via a payment processing component. The actual interactions with the payment gateways 106 may be provided through a card server environment. At the end of the checkout process, an order is created. An order is a contract of sale between the merchant and the customer where the merchant agrees to provide the goods and services listed on the order (e.g., order line items, shipping line items, and the like) and the customer agrees to provide payment (including taxes). Once an order is created, an order confirmation notification may be sent to the customer and an order placed notification sent to the merchant via a notification component. Inventory may be reserved when a payment processing job starts to avoid over-selling (e.g., merchants may control this behavior using an inventory policy or configuration for each variant). Inventory reservation may have a short time span (minutes) and may need to be fast and scalable to support flash sales or "drops", which are events during which a discount, promotion or limited inventory of a product may be offered for sale for buyers in a particular location and/or for a particular (usually short) time. The reservation is released if the payment fails. When the payment succeeds, and an order is created, the reservation is converted into a permanent (long-term) inventory commitment allocated to a specific location. An inventory component of the commerce management engine 136 may record where variants are stocked, and tracks quantities for variants that have inventory tracking enabled. It may decouple product variants (a customer-facing concept representing the template of a product listing) from inventory items (a merchant-facing concept that represents an item whose quantity and location is managed). An inventory level component may keep track of quantities that are available for sale, committed to an order or incoming from an inventory transfer component (e.g., from a vendor).

The merchant may then review and fulfill (or cancel) the order. A review component of the commerce management engine 136 may implement a business process merchant's use to ensure orders are suitable for fulfillment before actually fulfilling them. Orders may be fraudulent, require verification (e.g., ID checking), have a payment method which requires the merchant to wait to make sure they will receive their funds, and the like. Risks and recommendations may be persisted in an order risk model. Order risks may be generated from a fraud detection tool, submitted by a third-party through an order risk API, and the like. Before proceeding to fulfillment, the merchant may need to capture the payment information (e.g., credit card information) or wait to receive it (e.g., via a bank transfer, check, and the like) before it marks the order as paid. The merchant may now prepare the products for delivery. In some embodiments, this business process may be implemented by a fulfillment component of the commerce management engine 136. The fulfillment component may group the line items of the order into a logical fulfillment unit of work based on an inventory location and fulfillment service. The merchant may review, adjust the unit of work, and trigger the relevant fulfillment services, such as through a manual fulfillment service (e.g., at merchant managed locations) used when the merchant picks and packs the products in a box, purchase a shipping label and input its tracking number, or just mark the item as fulfilled. Alternatively, an API fulfillment service may trigger a third-party application or service to create a fulfillment record for a third-party fulfillment service. Other possibilities exist for fulfilling an order. If the customer is not satisfied, they may be able to return the product(s) to the merchant. The business process merchants may go through to "un-sell" an item may be implemented by a return component. Returns may consist of a variety of different actions, such as a restock, where the product that was sold actually comes back into the business and is sellable again; a refund, where the money that was collected from the customer is partially or fully returned; an accounting adjustment noting how much money was refunded (e.g., including if there was any restocking fees or goods that weren't returned and remain in the customer's hands); and the like. A return may represent a change to the contract of sale (e.g., the order), and where the e-commerce platform 100 may make the merchant aware of compliance issues with respect to legal obligations (e.g., with respect to taxes). In some embodiments, the e-commerce platform 100 may enable merchants to keep track of changes to the contract of sales over time, such as implemented through a sales model component (e.g., an append-only date-based ledger that records sale-related events that happened to an item).

Implementation in an e-Commerce Platform

Figure 12:
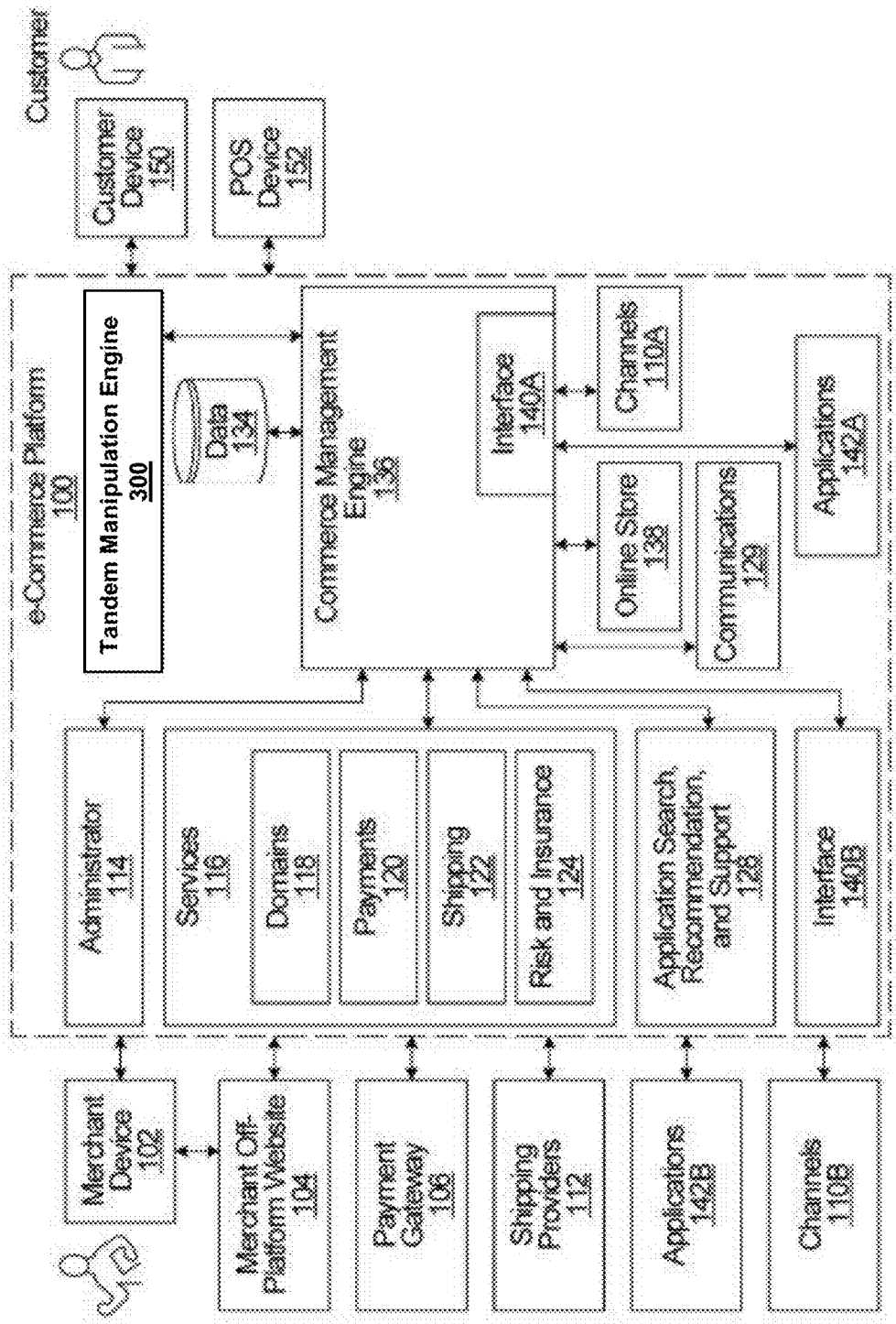
FIG. 12 is a block diagram illustrating an example of the e-commerce platform of FIG. 10 with an integrated tandem manipulation engine.

The functionality described herein may be used in commerce to provide improved customer or buyer experiences. The e-commerce platform 100 could implement the functionality for any of a variety of different applications, examples of which are described elsewhere herein. FIG. 12 illustrates the e-commerce platform 100 of FIG. 10 but including a tandem manipulation engine 300. The engine 300 is an example of a computer-implemented system that implements the functionality described herein for use by the e-commerce platform 100, the customer device 150 and/or the merchant device 102.

Although the engine 300 is illustrated as a distinct component of the e-commerce platform 100 in FIG. 12, this is only an example. An engine could also or instead be provided by another component residing within or external to the e-commerce platform 100. In some embodiments, either or both of the applications 142A-B provide an engine that implements the functionality described herein to make it available to customers and/or to merchants. Furthermore, in some embodiments, the commerce management engine 136 provides that engine. However, the location of the engine 300 is implementation specific. In some implementations, the engine 300 is provided at least in part by an e-commerce platform, either as a core function of the e-commerce platform or as an application or service supported by or communicating with the e-commerce platform. Alternatively, the engine 300 may be implemented as a stand-alone service to clients such as a customer device 150 or a merchant device 102. In addition, at least a portion of such an engine could be implemented in the merchant device 102 and/or in the customer device 150. For example, the customer device 150 could store and run an engine locally as a software application. The e-commerce platform 100 can therefore be considered an example of a computing environment 10 in which the tandem manipulation component 18 is implemented as an engine 300, coupled to the commerce management engine 136 and/or interface 140B to enable the tandem 3D manipulation mode to be integrated into a UI displayed to the merchant device 102, the customer device 150, or both.

As discussed in further detail below, the engine 300 could implement at least some of the functionality described herein. Although the embodiments described below may be implemented in association with an e-commerce platform, such as (but not limited to) the e-commerce platform 100, the embodiments described below are not limited to e-commerce platforms.

Example e-Commerce User Interfaces

Referring now to FIGS. 13a to 13c, an example of a UI 200 that is particularly suitable to an e-commerce or other web- or app-based search result listing is shown. The UI 200 in this example includes a number of listings 202, which can be a filtered list of search or category results or include a complete listing, e.g., within a catalogue of products. Each listing 202 includes a set of product details 204 and, in this example, a selection box 206 to illustrate one way to select desired ones of the listings 202 to be viewed in a tandem 3D manipulation mode. Also shown in each listing is an image 208 of the product. The image 208 can be a 2D image of a 3D view of the object 22, can be a reference image of a video, or can be the 3D model 26 of the object 22. In FIG. 13a, two products have been selected to be displayed as shown in FIG. 13b in the tandem 3D manipulation mode. Transitioning from FIGS. 13a to 13b can be performed using any suitable input 16 as discussed above and need not be repeated. As shown in FIG. 13b, a UI 250 is displayed with only a first object 234 that is displayed below a second object 236 with the corresponding product details 204 alongside each. The applied manipulation input 238a rotates the first and second objects 234, 236 individually in tandem as herein described to allow a user to rotate and compare the two associated products at the same time without having to navigate into and out of separate product pages. As illustrated in FIG. 13c, a further applied manipulation input 238a can be implemented to further manipulate the manipulated objects 234', 236' while in the tandem 3D manipulation mode. It can be appreciated that the UIs 200, 250 can be configured to allow navigation therebetween such that the user can go into and out of the tandem 3D manipulation mode, e.g., with different selections from UI 200.

Figure 14:
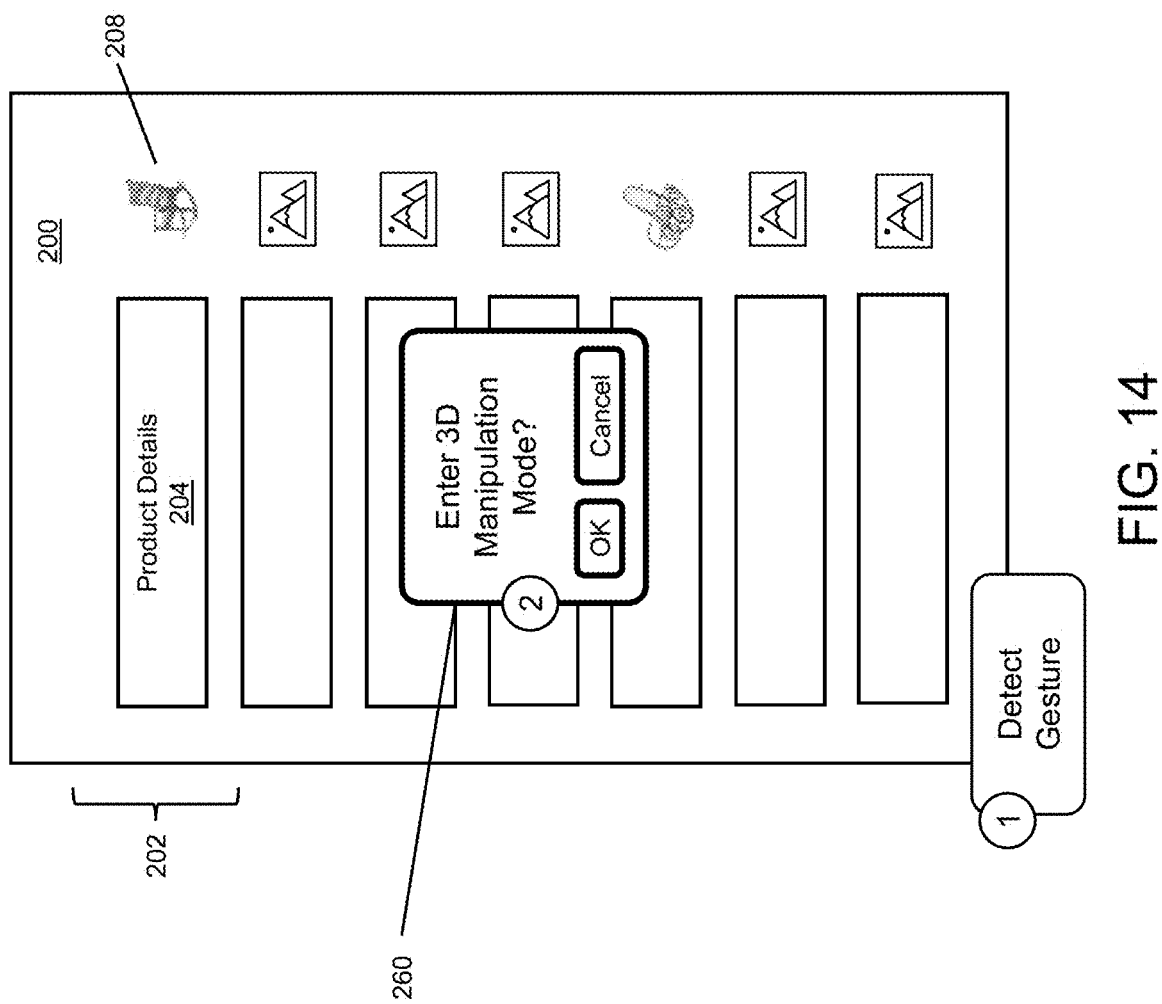
FIG. 14 shows an example of a user interface providing a tandem 3D manipulation option within a product or item listing, in which a gesture and prompt are used to confirm initiation of a tandem 3D manipulation mode.

The UI 200 shown in FIG. 13 can also incorporate various inputs or series of inputs to navigate into the tandem 3D manipulation mode as shown in FIGS. 13b-13c. For example, as shown in FIG. 14, a first input including gesture can be detected at stage 1, which initiates a prompt 260 at stage 2, requiring confirmation that the user wishes to enter the 3D manipulation mode. As such, it can be seen that various transitional inputs can be incorporated to ensure that loading the 3D models 26 is desired and/or as a further step implemented by the delay load component 30 to buy more time to load the 3D models 26 for the selected listings 202.

For simplicity and clarity of illustration, where considered appropriate, reference numerals may be repeated among the figures to indicate corresponding or analogous elements. In addition, numerous specific details are set forth in order to provide a thorough understanding of the examples described herein. However, it will be understood by those of ordinary skill in the art that the examples described herein may be practiced without these specific details. In other instances, well-known methods, procedures and components have not been described in detail so as not to obscure the examples described herein. Also, the description is not to be considered as limiting the scope of the examples described herein.

It will be appreciated that the examples and corresponding diagrams used herein are for illustrative purposes only. Different configurations and terminology can be used without departing from the principles expressed herein. For instance, components and modules can be added, deleted, modified, or arranged with differing connections without departing from these principles.

It will also be appreciated that any module or component exemplified herein that executes instructions may include or otherwise have access to computer readable media such as storage media, computer storage media, or data storage devices (removable and/or non-removable) such as, for example, magnetic disks, optical disks, or tape, whether locally or in a cloud-based entity. Computer storage media may include volatile and non-volatile, removable and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transitory computer readable medium which can be used to store the desired information and which can be accessed by an application, module, or both. Any such computer storage media may be part of the computing environment 10 or e-commerce platform 100, any component of or related thereto, etc., or accessible or connectable thereto. Any application or module herein described may be implemented using computer readable/executable instructions that may be stored or otherwise held by such computer readable media.

The steps or operations in the flow charts and diagrams described herein are provided by way of example. There may be many variations to these steps or operations without departing from the principles discussed above. For instance, the steps may be performed in a differing order, or steps may be added, deleted, or modified.

Although the above principles have been described with reference to certain specific examples, various modifications thereof will be apparent to those skilled in the art as having regard to the appended claims in view of the specification as a whole.

The invention claimed is:

1. A computer-implemented method comprising:
    receiving, via a user interface, a first input defining a manipulation to be applied to a three-dimensional (3D) object corresponding to a two-dimensional (2D) image displayed in the user interface, whereupon a corresponding 3D model is loaded to display the corresponding 3D object in the user interface;
    determining, from the first input, an initial positioning of the corresponding 3D model that is to be applied once the corresponding 3D model is loaded;
    detecting that the corresponding 3D model has been loaded;
    applying the initial positioning to the loaded 3D model to generate an updated 3D model;
    replacing the 2D image with the corresponding updated 3D model; and
    manipulating, in the user interface, the corresponding 3D object according to the first input.

2. The method of claim 1, wherein the manipulation defined by the first input comprises a rotation to be applied to the corresponding 3D object.

3. The method of claim 1, wherein:
the 2D image is displayed prior to receiving the first input, and wherein the first input comprises a first portion initiating a 3D manipulation mode and a second portion associated with applying the manipulation.

4. The method of claim 3, wherein the first and second portions of the first input correspond to a same gesture.

5. The method of claim 1, further comprising:
displaying a video corresponding to the 2D image while the corresponding 3D model is being loaded, the video playing a representative manipulation corresponding to the first input.

6. The method of claim 1, wherein the user interface displays a plurality of 3D objects, one of the plurality of 3D objects corresponding to the 2D image.

7. The method of claim 6, wherein the manipulating comprises rotating each of the plurality of 3D objects individually in tandem according to a rotation to be applied defined by the first input.

8. The method of claim 7, wherein at least two of the plurality of 3D objects comprise different views of a same object, and wherein the manipulating comprises rotating the different views of the same object individually in tandem.

9. The method of claim 6, further comprising:
aligning each 3D model to a same reference view; and
displaying the corresponding 3D objects aligned to the same reference view prior to receiving the first input.

10. The method of claim 9, wherein at least two of the 3D objects comprise a different reference view of a same object, and wherein the manipulating comprises changing an orientation relative to the different reference views.

11. The method of claim 6, wherein the manipulating is initiated in response to a selection of at least one of the 3D objects in the user interface.

12. The method of claim 1, further comprising associating at least one reference view with the corresponding 3D model by:
determining the at least one reference view to be applied to the corresponding 3D model;
applying an image processing technique to the corresponding 3D model to determine coordinates in the corresponding 3D model that correspond to each of the at least one reference view; and
storing metadata with the corresponding 3D model to enable alignment of the corresponding 3D model to a desired reference view in the user interface.

13. The method of claim 12, wherein the corresponding 3D model comprises a plurality of reference views.

14. The method of claim 1, wherein the 3D object is displayed in the user interface as a search result to a search query received from an input device.

15. A system comprising:
at least one processor;
at least one communications module to communicate with an input module of an electronic device; and
at least one memory, the at least one memory comprising computer executable instructions that, when executed by the at least one processor, cause the system to:
receive, via a user interface, a first input defining a manipulation to be applied to a three-dimensional (3D) object corresponding to a two-dimensional (2D) image displayed in the user interface, whereupon a corresponding 3D model is loaded to display the corresponding 3D object in the user interface;
determine, from the first input, an initial positioning of the corresponding 3D model that is to be applied once the corresponding 3D model is loaded;
detect that the corresponding 3D model has been loaded;
apply the initial positioning to the loaded 3D model to generate an updated 3D model;
replace the 2D image with the corresponding updated 3D model; and
manipulate, in the user interface, the corresponding 3D object according to the first input.

16. The system of claim 15, wherein the manipulation defined by the first input comprises a rotation to be applied to the corresponding 3D object.

17. The system of claim 15, wherein the user interface displays a plurality of 3D objects, one of the plurality of 3D objects corresponding to the 2D image.

18. The system of claim 17, wherein the computer executable instructions further comprise instructions that, when executed by the at least one processor, cause the system to:
align each 3D model to a same reference view; and
display the corresponding 3D objects aligned to the same reference view prior to receiving the first input.

19. The system of claim 15, wherein the computer executable instructions further comprise instructions that, when executed by the at least one processor, cause the system to:
display a video corresponding to the 2D image while the corresponding 3D model is being loaded, the video playing a representative manipulation corresponding to the first input.

20. A non-transitory computer readable medium comprising computer executable instructions that when executed by a processor of a computer system, cause the computer system to:
receive, via a user interface, a first input defining a manipulation to be applied to a three-dimensional (3D) object corresponding to a two-dimensional (2D) image displayed in the user interface, whereupon a corresponding 3D model is loaded to display the corresponding 3D object in the user interface;
determine, from the first input, an initial positioning of the corresponding 3D model that is to be applied once the corresponding 3D model is loaded;
detect that the corresponding 3D model has been loaded;
apply the initial positioning to the loaded 3D model to generate an updated 3D model;
replace the 2D image with the corresponding updated 3D model; and
manipulate, in the user interface, the corresponding 3D object according to the first input.

* * * * *